United States Patent
Lamb et al.

(10) Patent No.: US 12,464,196 B2
(45) Date of Patent: Nov. 4, 2025

(54) ATSC SIGNAL RECEIVER FOR PROCESSING DISPATCH MESSAGES

(71) Applicant: Device Solutions, Morrisville, NC (US)

(72) Inventors: Wilson Christopher Lamb, Hillsborough, NC (US); Anthony James Sammarco, Raleigh, NC (US); Mark T. Corl, Monroe Township, NJ (US); David Allen Catapano, Langhorne, PA (US)

(73) Assignee: Device Solutions, Morrisville, NC (US)

( * ) Notice: Subject to any disclaimer, the term of this patent is extended or adjusted under 35 U.S.C. 154(b) by 0 days.

(21) Appl. No.: 18/405,137

(22) Filed: Jan. 5, 2024

(65) Prior Publication Data

US 2025/0227343 A1    Jul. 10, 2025

(51) Int. Cl.
| | |
|---|---|
| *H04N 21/488* | (2011.01) |
| *B60W 60/00* | (2020.01) |
| *H04N 21/414* | (2011.01) |
| *H04N 21/438* | (2011.01) |
| *H04N 21/45* | (2011.01) |

(52) U.S. Cl.
CPC .... *H04N 21/4882* (2013.01); *B60W 60/0025* (2020.02); *H04N 21/41407* (2013.01); *H04N 21/4383* (2013.01); *H04N 21/4524* (2013.01); *B60W 2556/45* (2020.02)

(58) Field of Classification Search
CPC ........... H04N 21/4345; H04N 21/2362; H04N 21/64322; H04N 21/814; H04N 21/4882; B60W 2300/105; G08G 1/202; G08G 1/205

See application file for complete search history.

(56) References Cited

U.S. PATENT DOCUMENTS

| | | | |
|---|---|---|---|
| 9,948,417 B2 | 4/2018 | Kwon et al. | |
| 10,382,154 B2 | 8/2019 | Deshpande | |
| 11,729,039 B2 | 8/2023 | Simon et al. | |
| 2018/0048941 A1* | 2/2018 | Kitazato | H04L 67/52 |
| 2019/0124413 A1* | 4/2019 | Ng | H04N 21/2362 |
| 2019/0174204 A1* | 6/2019 | Deshpande | H04N 21/23614 |
| 2019/0212754 A1* | 7/2019 | Smith | G05D 1/0088 |
| 2019/0335221 A1* | 10/2019 | Walker | H04L 9/3268 |
| 2020/0007250 A1 | 1/2020 | Kwak et al. | |
| 2021/0289268 A1* | 9/2021 | Ng | H04N 21/8358 |
| 2022/0124401 A1* | 4/2022 | Fay | H04N 21/2143 |
| 2024/0357324 A1* | 10/2024 | Shintani | H04W 4/12 |

\* cited by examiner

*Primary Examiner* — Jason Salce
(74) *Attorney, Agent, or Firm* — Tarolli, Sundheim, Covell & Tummino LLP

(57) ABSTRACT

Operations of an Advanced Television Systems Committee (ATSC) receiver include receiving an ATSC broadcast signal, the ATSC broadcast signal including signaling characterizing content of a plurality of channels, wherein a dispatch channel includes dispatch messages. The operations include analyzing a low level signaling (LLS) table for the dispatch channel to determine whether a dispatch message has been added to the ATSC broadcast signal and selecting a mode of operation based on the analyzing. The modes of operation include a sleep mode if a version of the LLS table for the dispatch channel has not changed and a dispatch mode in response to detecting a change in the version of the LLS table. In the dispatch mode, dispatch messages not destined for the ATSC receiver are ignored and an emergency operation is actuated in response determining that a particular dispatch message is destined for the ATSC receiver.

23 Claims, 8 Drawing Sheets

ATSC SIGNAL RECEIVER FOR PROCESSING DISPATCH MESSAGES

CROSS-REFERENCE TO RELATED APPLICATION

This application is filed contemporaneously with U.S. patent application Ser. No. 18/405,098, entitled "ATSC BROADCAST SIGNAL WITH ENCODED DISPATCH MESSAGES", filed on 5 Jan. 2024 the entirety of which is herein incorporated by reference.

TECHNICAL FIELD

This disclosure relates to processing a received Advanced Television Systems Committee (ATSC) broadcast signal.

BACKGROUND

Advanced Television Systems Committee (ATSC) 3.0, also known as NextGen TV, represents a standard in digital television broadcasting. ATSC 3.0 is the terrestrial broadcast system designed to improve the television viewing experience with higher audio and video quality, improved compression efficiency, robust transmission for reception on both fixed and mobile devices, and more accessibility, personalization and interactivity. The ATSC 3.0 standard brings improvements compared to the predecessor, ATSC 1.0. These improvements include support for 4K ultra high definition (UHD) and immersive audio formats for better picture and sound quality. ATSC 3.0 also provides support for advanced modulation and coding techniques to ensure reliable reception, even in challenging environments, and the introduction of interactive features enables viewers to engage with content, access additional information and receive targeted advertisements. The ATSC 3.0 standard enables hybrid delivery capability enabling a combination of over-the-air broadcasting (terrestrial transmission) and Internet-based delivery (Internet Protocol (IP) based transmission) of television content. Accordingly, the hybrid delivery allows broadcasters to offer both linear programming and on-demand content.

SUMMARY

A first example is related to an Advanced Television Systems Committee (ATSC) receiver including a controller with embedded instructions for executing operations. The operations of the ATSC receiver include receiving an ATSC broadcast signal, the ATSC broadcast signal including signaling characterizing content of a plurality of channels. A subset of the plurality of channels includes encoded video and audio data and a dispatch channel of the plurality of channels includes dispatch messages. The operations of the ATSC receiver also include analyzing a low level signaling (LLS) table for the dispatch channel to determine whether a dispatch message has been added to the ATSC broadcast signal and selecting a mode of operation of a set of modes of operation based on the analyzing. The set of modes of operation include a sleep mode of operation if a version of the LLS table for the dispatch channel has not changed from a previous version and a dispatch mode of operation in response to detecting a change in the version of the LLS table for the dispatch channel. In the dispatch mode of operation, dispatch messages not destined for the ATSC receiver are ignored and an emergency operation is actuated in response determining that a particular dispatch message of the dispatch messages is destined for the ATSC receiver. The operations of the ATSC receiver also include executing, in response to the selecting, the selected mode of operation.

A second example relates to a method for processing an ATSC broadcast signal by an ATSC receiver including a controller with embedded instructions for executing the method. The method includes receiving an ATSC broadcast signal, the ATSC broadcast signal including signaling characterizing content of a plurality of channels. A subset of the plurality of channels includes encoded video and audio data and a dispatch channel of the plurality of channels includes dispatch messages. The method also includes analyzing an LLS table for the dispatch channel to determine whether a dispatch message has been added to the ATSC broadcast signal and selecting a mode of operation of a set of modes of operation based on the analyzing. The set of modes of operation include a sleep mode of operation if a version of the LLS table for the dispatch channel has not changed from a previous version and a dispatch mode of operation in response to detecting a change in the version of the LLS table for the dispatch channel. In the dispatch mode of operation, dispatch messages not destined for the ATSC receiver are ignored and an emergency operation is actuated in response determining that a particular dispatch message of the dispatch messages is destined for the ATSC receiver. The method also includes executing, by the ATSC receiver, in response to the selecting, the selected mode of operation.

DETAILED DESCRIPTION

Figure 1:
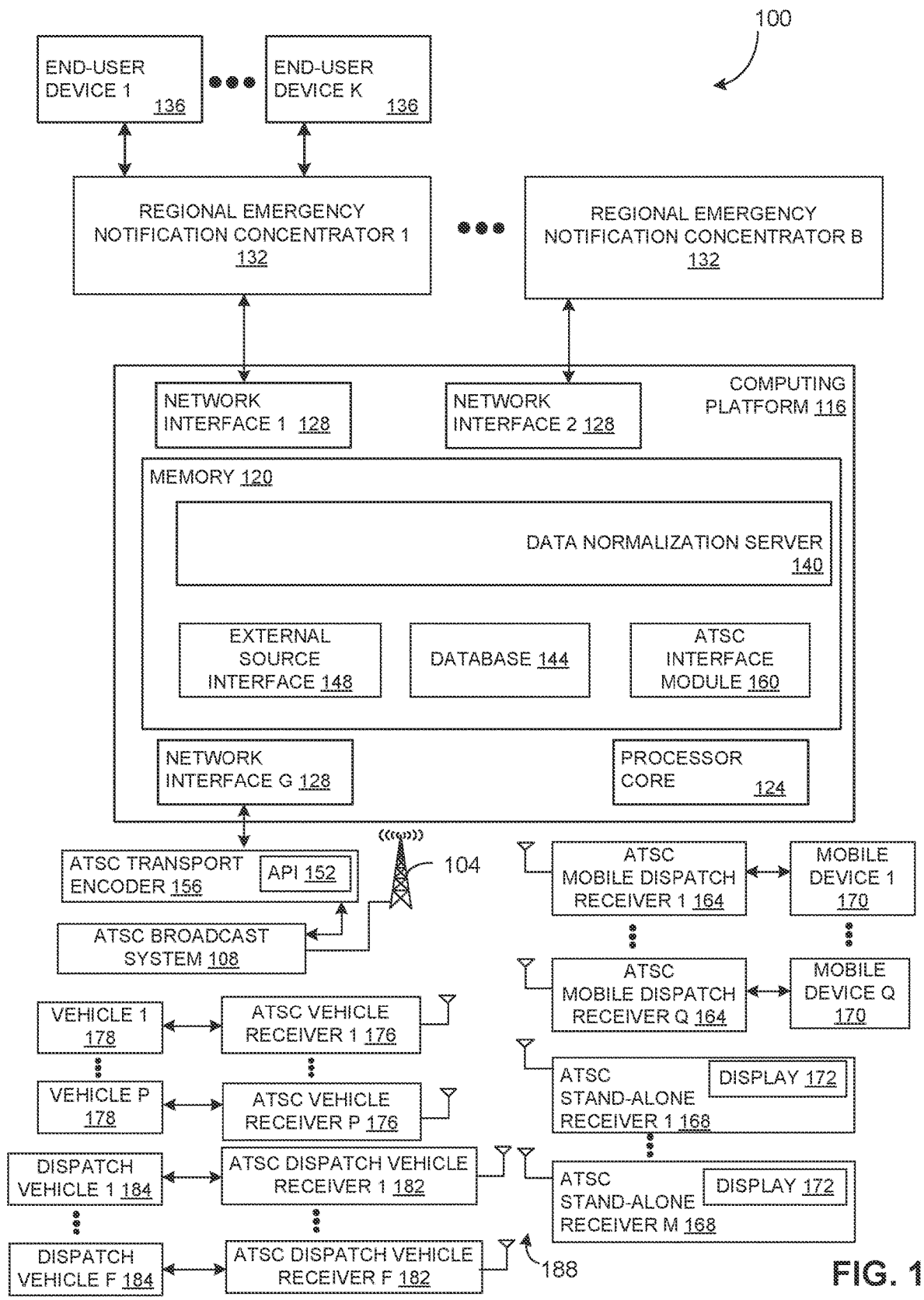
FIG. 1 illustrates an example of a system for broadcasting dispatch messages embedded in an Advanced Television Systems Committee (ATSC) signal.

This description is related to systems and methods for broadcasting dispatch messages (e.g., emergency messages) through an Advanced Television Systems Committee (ATSC) broadcast signal. The system includes a data normalization server executing on a computing platform. The data normalization server executes operations that include determining a geographical region of an emergency event responsive to an emergency notification from a regional emergency notification concentrator. The emergency notification concentrator can be a Public Safety Answering Point (PSAP) or an emergency autonomous vehicle control center (e.g. a unmanned aircraft systems (UAS) service supplier) or other system. The data normalization server augments the emergency notification with situational awareness data for the emergency event to provide an augmented emergency notification. The data normalization server outputs a broadcast dispatch data object (BDDO) that is generated based on the augmented emergency notification, wherein the BDDO includes a dispatch message with data characterizing the emergency event notification and the situational awareness data to an ATSC transport encoder. Additionally, the data normalization server generates application programming interface (API) call (or multiple API calls) to the ATSC transport encoder that cause the ATSC transport encoder to inject data encapsulated in the BDDO into a broadcast stream.

More particularly, the ATSC transport encoder executes on another computing platform and encapsulates data of the BDDO in a broadcast stream for an ATSC broadcaster in response to receiving the BDDO and the API call from the data normalization server. Parameters for the ATSC broadcaster broadcasts are specified in the API call. In some examples, the parameters for the API includes the BDDO with the data encapsulated therein. In other examples, the BDDO can be sent from the data normalization server to the ATSC transport encoder in a designated API call without message control parameters. The ATSC transport encoder transmits the broadcast stream to the ATSC broadcaster. In response, the ATSC broadcaster broadcasts an ATSC broadcast signal that includes a plurality of channels. The plurality of channels include a dispatch channel with the data of the BDDO encoded therein.

The system also includes an Advanced Television Systems Committee (ATSC) receiver with a controller (or other circuit) with embedded instructions for executing operations. More particularly, the ATSC receiver receives an ATSC broadcast signal (e.g., an ATSC 3.0 broadcast signal), the ATSC broadcast signal including signaling characterizing content of the plurality of channels. A subset of the plurality of channels includes encoded video and audio data. Moreover, the dispatch channel of the plurality of channels includes dispatch messages. A user defined low level signaling (LLS) table is defined by the ATSC broadcaster. This LLS table can include, but is not limited to ATSC-defined elements, meta data, a portion of the BDDO which indicates county/departments/skills/roles, etc. to allow the ATSC receiver to analyze and return to sleep if the ATSC receiver is not defined (provisioned to receive the data) to be within the targeted receiver(s) in the device group. More particularly, the ATSC receiver analyzes the LLS table for the dispatch channel to determine whether a dispatch message has been added to the ATSC broadcast signal. This analysis of the LLS table enables the ATSC receiver to ignore new messages not targeted for reception and enter a sleep mode a higher percentage of time which conserves battery life.

More generally, analysis of the LLS table for the dispatch channel enables the ATSC receiver to select a mode of operation of a set of modes of operation based on the data provisioned in the ATSC receiver. A sleep mode of operation (one of the set of modes of operation) is selected if a version of the LLS table for the dispatch channel has not changed from a previous version. A dispatch mode of operation (another one of the set of modes of operation) is selected in response to detecting a change in the version number of the LLS table for the dispatch channel. In the dispatch mode of operation, dispatch messages not destined for the ATSC receiver are ignored and an emergency operation is actuated in response determining that a particular dispatch message of the dispatch messages is destined for the ATSC receiver. In response to the selecting, the ATSC receiver executes the selected mode of operation.

FIG. 1 illustrates an example of a system 100 for broadcasting dispatch messages embedded an ATSC broadcast signal. In some examples, the ATSC broadcast signal complies with the ATSC 3.0 standards. However, in other examples, later standards are employable. The ATSC broadcast signal is propagated by an antenna 104 (e.g., an antenna tower) that is driven by an ATSC broadcaster 108 (e.g., a television broadcaster). The ATSC broadcaster 108 complies with the ATSC 3.0 or later standards.

The system 100 can include a computing platform 116, which is employable to implement a data normalization server. Accordingly, the computing platform 116 can include a memory 120 for storing machine-readable instructions and data and a processor core 124 for accessing the memory 120 and performing operations by executing the machine-readable instructions. The memory 120 represents a non-transitory machine-readable memory (or other medium), such as random access memory (RAM), a solid state drive, a hard disk drive or a combination thereof. The processor core 124 can be implemented as one or more processor cores. The computing platform 116 can include G number of network interfaces 128, where G is an integer greater than or equal to one. In examples where there are multiple network interfaces (e.g., G is greater than one), different network interfaces are employable to communicate over different networks, including a public network (e.g., the Internet), a private network (e.g., proprietary network, such as the Emergency Services IP Network (ESInet)) or a combination thereof, (e.g., a virtual private network). The G number of network interfaces 128 enable the computing platform 116 to communicate with other nodes of the system 100.

The computing platform 116 could be implemented in a computing cloud. In such a situation, features of the computing platform 116, such as the processor core 124, the G number of network interfaces 128 and the memory 120 could be representative of a single instance of hardware or multiple instances of hardware with applications executing across the multiple of instances (i.e., distributed) of hardware (e.g., computers, routers, memory, processors, or a combination thereof). Alternatively, the computing platform 116 could be implemented on a single dedicated server. Furthermore, in some examples the computing platform 116 can be employed to implement other nodes of the system 100 in a similar manner. However, for purposes of simplification of explanation, only the details of the computing platform 116 are illustrated.

The computing platform 116 is configured to communicate with B number of region emergency notification concentrators 132 (where B is an integer greater than or equal to one) through the G number of network interfaces 128, or some subset thereof. In various examples, the B number of region emergency notification concentrators 132 are implemented with computing platforms to handle dispatch messages for a specific geographic region.

As one example, a first emergency notification concentrator 132 (e.g., regional emergency notification concentrator 1) can be implemented with a E911 call center, such as a particular Public Safety Answering Point (PSAP). In such an example, the first emergency notification concentrator 132 communicates with K number of end-user devices 136 within the geographic region assigned to the first emergency notification concentrator 132. Some or all of the K number of end-user devices 136 can be implemented, for example, with a mobile device, such as a smart phone or a feature phone. Additionally, some or all of the K number of end-user devices 136 can be implemented with terrestrial phone lines (e.g., land lines). In this situation, the first emergency notification concentrator 132 communicates with the computing platform 116 through the ESINet or other emergency network.

The first emergency notification concentrator 132 includes a computing platform for generating a computer aided dispatch (CAD) notification for an emergency event reported by a particular end-user device 136. As one example, a user of the particular end-user device 136 makes a voice call to the first emergency notification concentrator 132 (a PSAP) and reports an emergency event. In such an example, an operator of the first emergency notification concentrator 132 employs a CAD system to generate the CAD notification that is provided to the computing platform 116 (executing a data normalization server) through a corresponding network interface 128, such that the CAD notification is provided as an emergency event notification to the data normalization sever 140.

Additionally or alternatively, the Bth regional emergency notification concentrator 132 (regional emergency notification concentrator B) can be implemented with an emergency autonomous vehicle control center. In such a situation, the Bth emergency notification concentrator 132 communicates with the computing platform 116 through a secure channel, such as through an encrypted channel of the Internet or through a proprietary network.

In examples where the Bth emergency notification concentrator 132 is an emergency autonomous vehicle control center, the Bth emergency notification concentrator 132 provides a temporary flight restriction (TFR) notification as a message that includes geographic boundaries for an emergency event, a location of an emergency event (with the geographic boundaries for the emergency event) and data characterizing a type of the emergency. This information is provided to the computing platform 116 through the corresponding network interface 128, such that the TFR notification is provided as the emergency event notification to the data normalization sever 140.

In various examples, there can be any number of emergency notification concentrators 132, and there can be a combination of different types. Moreover, the types of emergency notification concentrators 132 described are not meant to be limiting. In other examples, there could be more or less types of regional emergency notification concentrators 132 and/or there could be multiple instances of each type of emergency notification concentrator 132.

Each emergency notification concentrator 132 (or some subset thereof) can include the functionality and/or structure of a positioning center. The positioning center of each emergency notification concentrator 132 can be representative of nearly any non-landline positioning center, including a Mobile Positioning Center (MPC), a Gateway Mobile Positioning Center (GMLC), location retrieval function (LRF) and/or an emergency routing services (ERS) node, a VoIP Positioning Center (VPC), etc. The nodes of the system 100 can communicate with standard protocols, such as the HTTP (Hypertext Transfer Protocol)-Enabled Location Delivery Protocol (HELD) and/or the Mobile Location Protocol (MLP).

Each end-user device 136 can be employed by the respective caller to initiate an emergency services call. The emergency services call can be, for example, a voice 9-1-1 call, a 9-1-1 text (or short) message (e.g., a short message service (SMS) message or a real-time text (RTT) message), etc. The emergency services call can be a request for immediate emergency assistance, including ambulatory service, police assistance, fire department assistance, assistance on waterways or some combination thereof. In some examples, the end-user device 136 may be issued or controlled by a particular enterprise (e.g., a business) that maintains its own call center (e.g., a secondary call center) for handling emergency services calls.

The memory 120 of the computing platform 116 includes a data normalization server 140. The data normalization server 140 receives CAD messages (a form of emergency event notifications) from the emergency notification concentrators 132 that are implemented as PSAPs. The data normalization server 140 parses, timestamps and stores the incoming emergency event notifications in a database 144. However, because software employed at CAD workstations of the corresponding first emergency notification concentrator 132 (a PSAP) may be customized for local preferences, the parsing of the CAD messages can be tailored for each different emergency notification concentrator 132 to enable normalization of the data in the CAD message to enable the data normalization server 140 to generate a standard set of dispatch data for each emergency event notification. This standardized data is then efficiently communicated to the ATSC broadcaster 108.

In a similar manner, the data normalization server 140 can receive the TFR notifications (a form of emergency event notifications) from emergency notification concentrators 132 implementing emergency autonomous vehicle centers. In these situations, the data normalization server 140 also processes the TFR notifications in a similar manner as the CAD messages to generate standardized data for the ATSC broadcaster 108.

The normalization server 140 determines a geographical region of an emergency event responsive to the emergency notification from a particular regional emergency notification concentrator 132. The data normalization server 140 augments the CAD messages and/or the TFR notifications and/or other types of emergency event notifications with situational awareness data. In some examples, the data normalization server 140 employs an external interface source 148 to communicate with an external system (e.g., a map server, a weather server, a traffic server etc.) for information pertaining to a geographic location included in the CAD message, TFR notification and/or other types of emergency event notifications. Additionally or alternatively, the situational awareness data is retrieved from the database 144 (and/or another database) to retrieve predefined (e.g., static) situational awareness data about the geographic location for the CAD message the TFR notifications and/or other types of emergency event notifications. Thus, the situational awareness data can include building pre-plans, hydrant locations, graphic information system (GIS) data, weather data, real-time traffic data and/or responder status. In some examples, the situational awareness can also identify specific first responders and/or a category of first responders that are needed for the emergency event. For instance, the situational awareness can provide information indicating that firefighters assigned to a particular fire station are to be deployed to the emergency event.

The data normalization server 140 generates a Broadcast Dispatch Data Object (BDDO) that includes the data from the CAD message, TFR notification and/or other types of emergency event notifications, as well as the situational awareness, which can be collectively be referred to as a dispatch message. The BDDO is generated based on an augmented emergency notification in some examples. The data normalization server 140 generates a call to an application programming interface (API 152) (e.g., an API call) of an ATSC transport encoder 156 that communicates with the ATSC broadcaster 108. The API call includes parameters for the ATSC transport encoder 156 to inject a portion of the data encapsulated in the BDDO into a broadcast stream for the ATSC broadcaster 108. In some examples, the parameters for the API call include the BDDO (which encapsulates data). In other examples, the BDDO can be provided from the data normalization server 140 to the ATSC transport encoder 156 in a designated API call without message control parameters. The API call generated by the data normalization server 140 is provided to the ATSC transport encoder 156 through an ATSC interface module 160 that includes, for example, a library of the API 152 of the ATSC transport encoder 156. In varying examples, some features may be implemented in different physical and/or logical positions from that illustrated. For example, in some situations, the ATSC interface module 160 can be physically and/or logically situated between the network interface G 128 and the ATSC transport encoder 156. In such an example, the ATSC interface module 160 could be executing on an external computing platform (not shown).

The data normalization server 140 serves as a front-end for controlling the broadcasting of dispatch messages on the ATSC broadcast signal. The data normalization server 140 interfaces with data sources such as the G number of emergency notification concentrators 132, normalizes the data, and injects data into the BDDO. In summary, the data normalization server 140 facilitates standardizing, enhancing and efficiently broadcasting dispatch messages for public safety purposes.

More particularly, the API 152 leveraged by the data normalization server 140 is updated to communicate the end bandwidth used by the various dispatch messages. The data normalization server 140 can actively manage the number of messages, the period between broadcasts, the total time the broadcast will be sent, the robustness of the baseband encoding, and the management of time slices for sets of messages to ensure a particular "net communications bandwidth". Unlike video, which has known bandwidth requirements, transmitting dispatch messages has a range of bandwidth requirements over the course of a day. Hence, managing the bandwidth allocation elevates a probability of a successful broadcast of dispatch messages.

The data normalization server 140 can add message control parameters to the API call that specify how data encapsulated in the BDDO is broadcasted. The message control parameters include information characterizing how often a dispatch message is repeated (e.g., a repetition rate), where to send the dispatch message (state, region, local), a selected antenna for broadcasting, priority of the dispatch message, an adjustment made based on the number of dispatch messages (pages) at any given time and/or a request for modification and/or conditional adjustments based on traffic.

The API call and the parameters (which can include the message control parameters and the BDDO in some examples) from the data normalization server 140 are received at the ATSC transport encoder 156 which operates in a manner controlled by the API calls. In response to the API call and the BDDO from the normalization server 140, the ATSC transport encoder 156 creates the necessary signaling and encapsulates the data extracted from the BDDO (or some portion thereof) into dispatch messages that are in a form acceptable by the ATSC broadcaster 108. The ATSC transport encoder 156 manages details to broadcast the dispatch messages encoded in the BDDO in User Datagram Protocol (UDP) packets with the correct IP address and to interleave the dispatch messages into the Application Layer Protocol (ALP) on the correct Physical Layer Pipe (PLP). The ATSC transport encoder 156 can be configured to repeat higher priority dispatch messages more often and earlier in a frame of a broadcast stream. The BDDO can include qualifying data ("qual data") that is employable by receiving devices to determine whether each such receiving device is an intended destination for a dispatch message corresponding to the BDDO.

The API 152 is customized to enable control of the operations of the ATSC transport encoder 156 through the data normalization server 140. Accordingly, by employment of API calls to the API 152, the ATSC transport encoder 156 receives the data in the BDDO, and injects a dispatch message that include the data from the BDDO (or some portion thereof) into the broadcast stream that is provided to the ATSC broadcaster 108. Responsive to the broadcast stream, the ATSC broadcaster 108 generates a ATSC broadcast signal that is propagated (transmitted) by the antenna 104 (or multiple antennas 104), and the ATSC broadcast signal encodes a multi group broadcast channel. The broadcast stream includes an encoded dispatch message that is based on the BDDO. In some examples, the ATSC broadcast signal has a frequency between 54 megahertz (MHz) and 216 MHz or between 470 MHz and 698 MHz, and conforms to the ATSC 3.0 standard or later standard. In other examples, other frequencies are possible. For instance, later standards may enable additional and/or alternative frequencies.

Figure 2:
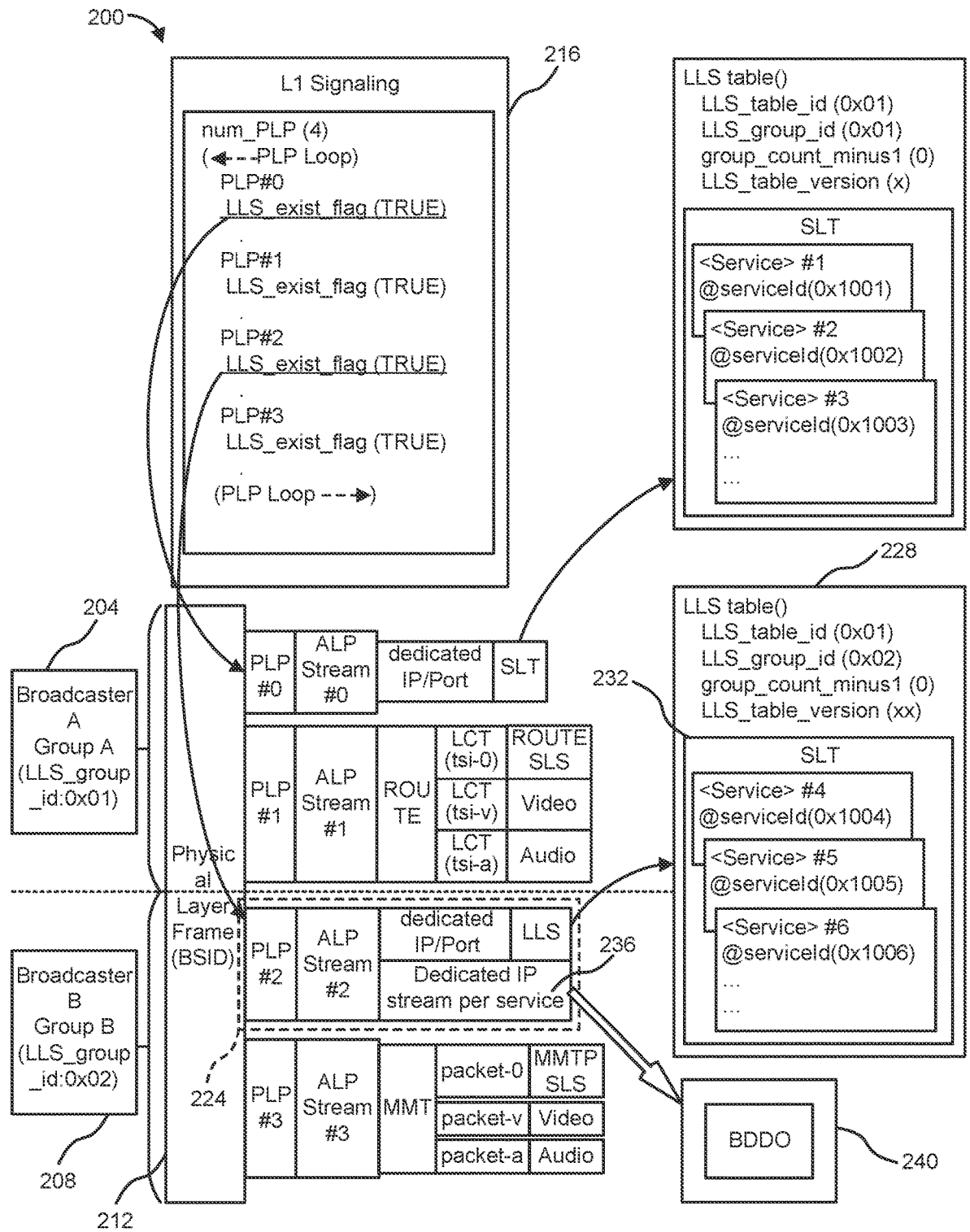
FIG. 2 illustrates an example of architecture for a multi group broadcaster channel of an ATSC broadcast signal.

FIG. 2 illustrates an example of architecture for a multi group broadcaster channel 200 provided in an ATSC broadcast signal conforming to the ATSC 3.0 or later standard. The multi group broadcaster channel 200 is provided from a given broadcaster, and has two groups, Group A 204 and Group B 208. The multi group broadcaster channel 200 includes a physical layer frame 212 that represents a combination of the Group A 204 and the Group B 208. The physical layer frame 212 has a Broadcast Stream Identifier (BSID) that uniquely identifies the broadcaster of the multi group broadcaster channel 200. The BSID is a 16-bit value that identifies the aggregate contents of a broadcast signal. Each transmitted signal that is unique (has content that is different from another signal) has a unique BSID such that a signal translated onto a different frequency has the same BSID. The physical layer frame 212 includes N number PLPs (alternatively referred to as channels), where N is an integer greater than one. The PLPs can have the same or different modulation and coding scheme and/or coding rate based on the needs of content within a particular PLP. The N number of PLPs enables the ATSC broadcaster providing the multi group broadcaster channel 200 to adjust features of the physical layer frame 212 on the fly to meet certain criteria.

The physical layer frame 212 includes a synchronization PLP (PLP 0) that has layer 1 (L1) signaling 216 that is provided in a signal field (L1-Signal Field) of the Group A 204. The L1 signaling 216 has a designated section within the Physical Layer frame 212 that contains information related to the physical layer transmission parameters and signaling. The L1 signaling 216 includes PLP Signaling Information (PLP-SI) that list the plurality of PLPs. More particularly, the L1 signaling 216 includes Boolean expressions (TURE/FALSE) for each of the N number of PLPs, defining the presence or absence of a particular PLP. The multi group broadcaster channel 200 includes a dedicated PLP for dispatch messages (pages), which can be referred to as a dispatch PLP 224.

The L1 signaling 216 also includes a low level signaling (LLS) table which is carried in the Transport L3 (layer 3) for the N number of PLPs. In some examples, the LLS tables described are structured using the extensible markup language (XML) format and may be encoded in a particular binary format for transmission and hosted on a dedicated IP address for accessibility by compatible ATSC receivers. The LLS table for a given PLP includes a table identifier (ID), a group ID that identifies a particular broadcast group of the multi group broadcaster channel 200, and a version number that identifies a particular version of the given LLS table. In FIG. 2, details for a custom defined dispatch LLS table 228 assigned to the dispatch PLP 224 are included. The dispatch LLS table 228 assigned to the dispatch PLP 224 is a customized LLS table that conforms to at least the ATSC 3.0 standard. The dispatch LLS table 228 includes a customized service list table (SLT) 232 that specifies the services included in the dispatch PLP 224. The services in the SLT 232 can be, for example, information related to individual dispatch messages (e.g., the BDDO 240) that are to be broadcast to specific ATSC receivers.

The dispatch PLP 224 encodes the dispatch messages and is configured to provide an elevated broadcast range at a different bitrate as defined by modulation and coding rates than the PLPs used for audio/video broadcast, such as standard television programming. In some examples, the dispatch PLP 224 (a dispatch channel) has a different modulation scheme and/or a lower or higher bitrate than the remaining channels of the multi group broadcaster channel 200 of the ATSC broadcast signal. Utilizing standardized ATSC 3.0 channel architecture (and/or other later standards) to provide the dispatch PLP 224 (alternatively referred to as an emergency PLP), which is a dedicated PLP for the dispatch messages (that include emergency dispatch data) enables IP streams 236 of the dispatch PLP 224 to transport a BDDO 240, generated by a data normalization server (e.g., the data normalization server 140 of FIG. 1). For instance, in some examples the dispatch PLP 224 (a dispatch channel) identifies a subset of ATSC receivers (e.g., a proper subset of ATSC receivers) associated with the dispatch message encoded in the BDDO.

Referring back to FIG. 1, ATSC receivers are configured to receive the broadcast signal propagated by the ATSC broadcaster 108. In various examples, the ASTC receivers include consumer grade and commercial entertainment equipment, such as digital television receivers. In most situations, such entertainment equipment is configured to ignore the dispatch messages embedded in the broadcast signal.

Additionally, the ATSC receivers can include Q number of mobile dispatch receivers 164 and M number of ATSC stand-alone receivers 168, where Q and M are integers greater than or equal to one. The Q number of mobile dispatch receivers 164 are configured as paging companion devices that communicate with a corresponding mobile device 170, such that there are also Q number of mobile devices 170. In some examples, the Q number of mobile dispatch receivers 164 communicate with the corresponding mobile device 170 wirelessly, such as through a Bluetooth connection. The Q number of mobile devices 170 can be implemented, for example, as a computing platform, such as smartphones, smartwatches, tablet computers, laptop computers, etc. As one example, the Q number of mobile dispatch receivers 164 can be implemented as key fobs for a keychain. The M number of ATSC stand-alone receivers 168 are implemented as standalone devices that include a display 172, which can be a text display, a graphical display or a combination thereof.

The ATSC receivers can also include P number of ATSC vehicle receivers 176 that are coupled to (or integrated with) corresponding vehicles 178, where P is an integer greater than or equal to one. The vehicles 178 can be implemented, for example as autonomous vehicles, such as drones, self-driving terrestrial vehicles (self-driving cars), etc.

The ATSC receivers can further include F number of ATSC dispatch vehicle receivers 182 that are coupled to (or integrated with) corresponding dispatch vehicles 184 (e.g., emergency or first responder vehicles, where F is an integer greater than or equal to one. The F number of dispatch vehicles 184 can be autonomous vehicles (e.g., drones, self-driving terrestrial vehicles, etc.) equipped with, or capable of being equipped with devices to assist with emergency situations, such as fire extinguishers, video recorders, etc.

The Q number of mobile dispatch receivers 164, the M number of ATSC stand-alone receivers 168, the P number of ATSC vehicle receivers 176 and the F number of ATSC dispatch vehicle receivers 182 are provisioned (with provisioning data stored therein) to selectively decode a subset of the dispatch messages embedded in the multi group broadcaster channel. More particularly, the Q number of mobile dispatch receivers 164, the M number of ATSC stand-alone receivers 168, the P number of ATSC vehicle receivers 176 and the F number of ATSC dispatch vehicle receivers 182 are provisioned to actuate (execute) an emergency operation responsive to detecting a dispatch message in the subset of dispatch messages destined for the corresponding provisioned ATSC receiver. Collectively, the Q number of mobile dispatch receivers 164, the M number of ATSC stand-alone receivers 168, the P number of ATSC vehicle receivers 176 and the F number of ATSC dispatch vehicle receivers 182 can be referred to as ATSC dispatch receivers 188. The ATSC dispatch receivers 188 are mobile devices that operate on batteries (disposable or rechargeable). Thus, the ATSC dispatch receivers 188 are configured to conserve battery life to extend an interval of time between needed recharging or battery replacement. Moreover, in some examples the ATSC dispatch receivers 188 can include a controller with embedded instructions for executing operations.

Returning to FIG. 2, the ATSC dispatch receivers 188 of FIG. 1 can be programmed to periodically (e.g., once per second to once per minute) and/or asynchronously parse the LLS tables in the L1 signaling 216 which is carried in the Transport L3 to identify a PLP of the N number PLPs that is the dispatch PLP 224. More particularly, the ATSC dispatch receivers 188 can be provisioned to identify an LLS table as the dispatch LLS table 228 (a custom defined LLS table assigned to the dispatch PLP 224) based on the LLS table ID. Moreover, different ATSC dispatch receivers 188 can be provisioned to identify different LLS tables as the dispatch LLS table 228 for the dispatch PLP 224. For instance, the P number of ATSC vehicle receivers 176 may be provisioned to search for a different dispatch LLS than the Q number of mobile dispatch receivers 164 and the M number of ATSC stand-alone receivers 168. In other examples, the ATSC dispatch receivers 188 can be provisioned to search for the same LLS table (based on the LLS table ID).

Responsive to identifying the dispatch LLS table 228, a given ATSC dispatch receiver 188 (of the ATSC dispatch receivers 188) can examine the version number of the dispatch LLS table 228 to determine whether a current dispatch LLS table 228 has changed since the given ATSC dispatch receiver 188 last examined a previous dispatch LLS table 228. If the current dispatch LLS table 228 has the same version number as the previous dispatch LLS table 228, the given ATSC dispatch receiver 188 can operate in a sleep mode, wherein the given ATSC dispatch receiver 188 can cease further processing of the multi group broadcaster channel 200 to conserve battery life. That is, in the sleep mode, the given ATSC dispatch receiver 188 inhibits further analysis of the ATSC broadcast signal, including the multi group broadcaster channel 200 to conserve battery life.

Conversely, in situations where the current dispatch LLS table 228 is different from the previous dispatch LLS table 228 (the change identified by a change in the table version number), the given ATSC dispatch receiver 188 selects a dispatch mode of operation, wherein the given ATSC dispatch receiver 188 examines the services included in the SLT 232 (a customized SLT) of the dispatch LLS table 228. The change in version number of the dispatch LLS table 228 can indicate that at least one new dispatch message has been added to the dispatch PLP 224 since the previous version of the dispatch LLS table 228 was generated. The services included in the SLT 232 are implemented as dispatch messages encapsulated in the IP streams 236 of the dispatch PLP 224. In some examples, the SLT 232 of the dispatch LLS table 228 can be ignored by conventional television receivers.

Continuing in the dispatch mode, in some situations, the given ATSC dispatch receiver 188 can be provisioned to decode new dispatch messages in the IP streams 236 and determines if the data encoded the BDDO 240 of each such new dispatch messages matches provisioning data stored in the given ATSC dispatch receiver 188 to determine if the new dispatch message is destined for the given ATSC dispatch receiver 188. In other examples, UDP port addressing is employed in the provisioning of the ATSC dispatch receivers 188 to enable the given ATSC dispatch receiver 188 to identify which dispatch messages encoded in the dispatch PLP 224 are destined for the given ATSC dispatch receiver 188. For example, in some instances, dispatch messages can be assigned a specific destination IP address (or range of IP addresses) and port. In some such situations, qualifying data of the provisioning data of the given ATSC dispatch receiver 188 can be leveraged for message filtering, which can further improve battery life of the given ATSC dispatch receiver 188.

Summarily, the given ATSC dispatch receivers 188 receives the ATSC broadcast signal that includes the multi group broadcaster channel 200. The ATSC broadcast signal includes signaling (e.g., the LLS signaling) characterizing content of a plurality of channels. A subset of the plurality of channels (e.g., PLP 1 and PLP 3) includes encoded video and audio data and the dispatch channel (dispatch PLP 224, namely PLP 2) of the plurality of channels includes dispatch messages encoded in the BDDO 240. The given ATSC dispatch receiver 188 analyzes the dispatch LLS table 228 (the LLS table for the dispatch channel) to determine if a dispatch message has been added to the ATSC broadcast signal. The given ATSC dispatch receiver 188 selects a mode of operation of a set of modes of operation based on the analysis. The set of modes of operation include the sleep mode of operation if a version of the dispatch LLS table 228 has not changed from a previous version. The set of modes of operation also include the dispatch mode of operation in response to detecting a change in the version number of the LLS table for the dispatch channel. In the dispatch mode of operation, the dispatch messages not destined for the ATSC dispatch receiver are ignored and an emergency operation is actuated in response determining that a particular dispatch message of the dispatch messages is destined for the ATSC receiver. Additionally, in response to selecting the mode of operation, the ATSC receiver executes the selected more of operation.

Referring back to FIG. 1, different ATSC dispatch receivers 188 can be provisioned differently to control which dispatches messages are destined for a particular ATSC dispatch receiver 188. For example, a firefighter assigned a first ATSC stand-alone receiver 168 (e.g., ATSC dispatch receiver 1) might be provisioned to be a destination of dispatch messages associated with a particular fire station. Conversely, a fire chief that is assigned a first mobile dispatch receiver 164 might be provisioned to be a destination of dispatch messages associated with multiple fire stations within a particular geographic region (e.g., a municipality).

Additionally, in some examples, the P number of ATSC vehicle receivers 176 and the F number of ATSC dispatch vehicle receivers 182 may be provisioned to be a destination of dispatch messages associated with a particular geographic area corresponding to geographic coordinates that may be encoded in the BDDO encapsulated in the multi group broadcaster channel.

Furthermore, different types of ATSC dispatch receivers 188 can actuate different emergency operations responsive to identifying a dispatch message destined for the given ATSC dispatch receiver 188. In particular, responsive to identifying a dispatch message destined for a given ATSC stand-alone receiver 168 of the M number of ATSC stand-alone receivers 168, the given ATSC stand-alone receiver 168 can be programmed to output information on the display 172 and/or audio information characterizing situational awareness data and/or other information encoded in the BDDO. This information can include, for example, the address, time and nature of an emergency event. Additional situational awareness data can include, for example, a building floor or a vehicle type and/or color. These data types will vary based on the nature of the emergency corresponding to the dispatch message.

Additionally, responsive to identifying a dispatch message destined for a given mobile dispatch receiver 164 of the Q number of mobile dispatch receivers 164, the given mobile dispatch receiver 164 can forward the dispatch message to an application (e.g., an app or application software) executing on the corresponding mobile device 170. The dispatch message can include situational awareness information, including the address, time and nature of an emergency event, a building floor, a vehicle type and/or color, which will vary based on the nature of the emergency corresponding to the dispatch message. The application executing on the corresponding mobile device 170 receives and processes the dispatch message.

Responsive to the dispatch message, the application executing on the corresponding mobile device 170 can actuate dispatch operations for the corresponding mobile device. These dispatch operations can include, for example, a query to a web mapping platform for travel information (e.g., turn-by-turn directions to the address). The application can also communicate with a server for real-time updates that can change as a first responder is in route to the location of the emergency event. The information can be aggregated and displayed on a display of the corresponding mobile device 170. Additionally, in some examples, audio information (e.g., a recording of a person that reported the emergency event and/or an address, turn-by-turn directions, etc.) can be output by the corresponding mobile device 170.

Further, the Q number of mobile devices 170 (or some subset thereof) can establish a communication channel with the data normalization server 140 that includes a confirmation message that the dispatch message has been received at the corresponding ATSC mobile dispatch receiver 164. In some examples, the mobile devices 170 can also provide updated location information indicating that a user of each mobile device 170 is in route to a location identified in the dispatch message. This information is employable by the data normalization server 140 for example, to determine a real-time status of a response to the emergency event. This real-time status can be provided to an administration application executing on an end-user device (not shown), such as an external computing platform (e.g., a server, a workstation, etc.) that is in communication with the data normalization server 140 executing on the computing platform 116.

Also, responsive to identifying a dispatch message destined for a ATSC vehicle receiver 176 of the P number of ATSC vehicle receivers 176, the given ATSC vehicle receiver 176 can actuate an evacuation operation for the corresponding vehicle 178. More particularly, in some examples, a given ATSC vehicle receiver 176 is in communication with (or integrated with) a controller of the corresponding vehicle 178. In such a situation, the dispatch message includes a TFR notification along with geographic coordinates for a protected boundary, which can circumscribe a TFR region. The controller of the corresponding vehicle 178 analyzes the TFR region and determines whether the corresponding vehicle 178 is within or on a trajectory to enter the protected boundary (e.g., compare the protected boundary with geographic coordinates of a present location of the corresponding vehicle 178). If the corresponding vehicle 178 is outside the TFR region and does not have a trajectory to enter the TFR region specified in the TFR, the corresponding vehicle 178 of the given ATSC vehicle receiver 176 can continue normal operations, as long as the normal operations do not cause the corresponding vehicle 178 to enter the TFR region. Conversely, if the controller of the corresponding vehicle 178 determines that the corresponding vehicle 178 is located within the TFR region, the controller generates instructions for the corresponding vehicle 178 that cause the corresponding vehicle 178 to change course and to exit the TFR region as quickly as possible (e.g., the evacuation operation).

Further still, responsive to identifying a dispatch message destined for a given dispatch vehicle receiver 182 of the F number of ATSC dispatch vehicle receivers 182, the dispatch vehicle receiver 182 can actuate a dispatch operation for the corresponding dispatch vehicle 184. More particularly, in some examples, the given dispatch vehicle receiver 182 is in communication with (or integrated with) a controller of the corresponding dispatch vehicle 184. In such a situation, the dispatch message, a TFR notification, includes geographic coordinates for an emergency event. The controller of the corresponding vehicle 178 analyzes the geographic coordinates for the emergency event and instructions that cause the corresponding vehicle to deploy and travel to a region near or at the geographic coordinates of the emergency event. In some examples, responsive to arrival at the geographic coordinates of the emergency event, the controller causes the corresponding dispatch vehicle 184 to execute remedial measures, such as capturing images, releasing a reservoir of fire retardant and/or water. The particular operations for the remedial measures can vary based on a nature of the emergency event.

By employment of the system 100, the data normalization server 140 enables the B number of first emergency notification concentrators 132 to leverage ATSC broadcasting signals (e.g., using at least the ATSC 3.0 standards) to deploy dispatch messages to the ATSC dispatch receivers 188 (which include multiple types of ATSC dispatch receivers). ATSC broadcasting signals (e.g., the multi group broadcaster channel 200 of FIG. 2) are robust and provide adequate terrestrial propagation for dispatch messages that encapsulate situational awareness information for emergencies. Moreover, the ATSC broadcasting signals provide a larger coverage area than other forms of wireless communication, such as cellular phone signals.

Further, the API 152 of the ATSC transport encoder 156 provides a library of instructions (commands) that enable the data normalization server 140 to selectively provide the dispatch messages to specific subsets of the ATSC dispatch receivers 188. In fact, the data normalization server 140 can generate different dispatch messages for different types of ATSC dispatch receivers 188.

Also, the Q number of mobile dispatch receivers 164 and the M number of ATSC stand-alone receivers 168 can be configured to actuate emergency operations for certain dispatch messages destined thereto, and to ignore other dispatch messages. This enables the Q number of mobile dispatch receivers 164 and the M number of ATSC stand-alone receivers 168 to operate in a sleep mode in certain situations to conserve battery life and enables the same physical device to be provisioned to people of different levels of authority (e.g., a fire chief and a firefighter).

Moreover, because the ATSC 3.0 standard is robust and has greater geographic coverage than signals transmitted from cellular towers, the system 100 provides a greater geographic coverage than an emergency broadcast system that leverages cellular signals. Additionally, the ATSC 3.0 standard is a digital standard that provides superior geographic than analog voice paging. Furthermore, because the data for dispatch messages is encoded in the BDDO, in some examples, the data encoded in the BDDO can be encrypted by the ATSC dispatch receivers 188, or some subset thereof, enabling private data, such as patient data (protected by HIPPA laws) to be transmitted through the ATSC broadcast signal. Additionally, the CAD data generated by the first emergency notification concentrator 132 (or other first emergency notification concentrator 132) can be sent to a selected subset of the ATSC dispatch receivers 188 in 10 seconds or less in some examples.

Figure 3:
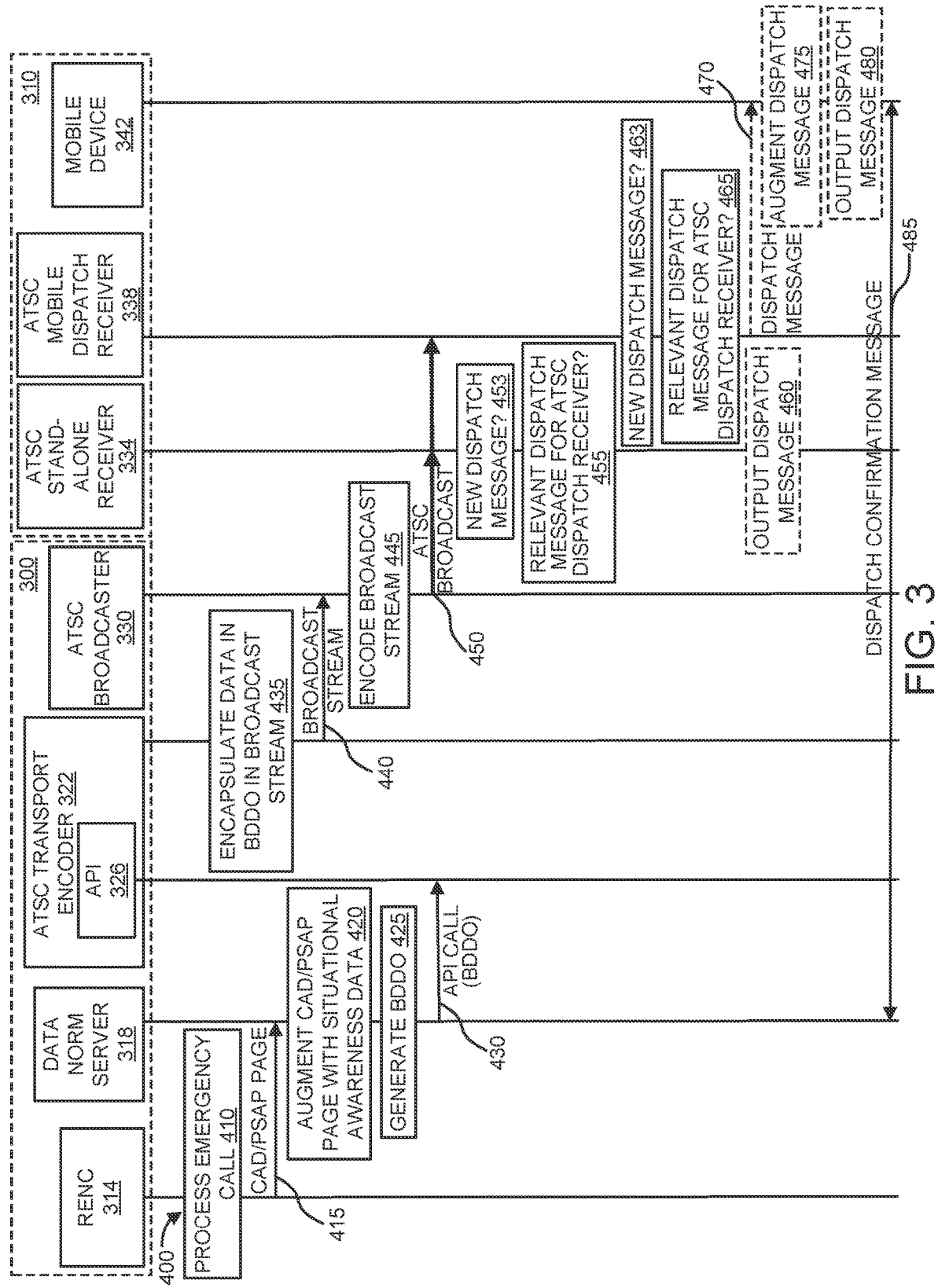
FIG. 3 illustrates a sequence diagram of a dispatch broadcast system that is employed to broadcast dispatch messages to ATSC dispatch receivers over an ATSC broadcast signal.

FIG. 3 illustrates a sequence diagram of a dispatch broadcast system 300 that is employed to broadcast dispatch messages to ATSC dispatch receivers 310 over an ATSC broadcast signal that conforms to at least the ATSC 3.0 standards. The dispatch broadcast system 300 and the ATSC dispatch receivers 310 in combination are employable to implement the system 100 of FIG. 1.

The dispatch broadcast system 300 includes a regional emergency notification concentrator 314 (labeled "RENC" in FIG. 3) that is employable to implement a given emergency notification concentrator 132 of B number of emergency notification concentrators 132 of FIG. 1. The regional emergency notification concentrator 314 communicates with a data normalization server 318 of the dispatch broadcast system 300 that is employable to implement the data normalization server 140 of FIG. 1. The system 300 includes an ATSC transport encoder 322 that is employable to implement the ATSC transport encoder 156 of FIG. 1. The ATSC transport encoder 322 includes an API 326. The data normalization server 318 includes an ATSC interface module (e.g., the ATSC interface module 160 of FIG. 1) that generates API calls that cause the ATSC transport encoder 322 to execute specific operations for encapsulating data in a broadcast stream that is broadcast by an ATSC broadcaster 330, which is employable to implement the ATSC broadcaster 108 of FIG. 1.

The ATSC dispatch receivers 310 include an ATSC stand-alone receiver 334 that is employable to implement a given ATSC stand-alone receiver 168 of the M number of ATSC stand-alone receivers 168 of FIG. 1. The ATSC dispatch receivers 310 also include an ATSC mobile dispatch receiver 338 that is employable to implement an ATSC stand-alone receiver 168 of the Q number of mobile dispatch receivers 164 of FIG. 1. The ATSC mobile dispatch receiver 338 communicates with a mobile device 342, such as one of the Q number of mobile devices 170 of FIG. 1.

The dispatch broadcast system 300 and the ATSC dispatch receivers 310 are employable to implement a method 400 for broadcasting a dispatch message to the ATSC stand-alone receiver 334 and the ATSC mobile dispatch receiver 338 using an ATSC broadcast signal. At 410, the regional emergency notification concentrator 314 processes an emergency call from an end-user device (e.g., one of the K number of end-user devices 136 of FIG. 1). In response to the emergency call, at 415, the regional emergency notification concentrator 314 generates a CAD and/or a PSAP page that is provided to the data normalization server 318 as an instance of an emergency notification message.

The CAD and/or PSAP page can include, for example, an address of an emergency event, and a nature of the emergency event. In response, at 420, the data normalization server 318 determines a geographical region of an emergency event characterized in the CAD and/or PSAP page. Also at 420, the data normalization server can augment the CAD and/or PSAP page with situational awareness data. In some examples, the data normalization server 140 employs an external interface source (e.g., the external interface source 148 of FIG. 1) to communicate with an external system (e.g., a map server, a weather server, a traffic server, etc.) for information pertaining to a geographic location included in the CAD message and/or the emergency request. Additionally or alternatively, the situational awareness data is retrieved from a database (e.g., the database 144) to retrieve predefined (e.g., static) situational awareness data about the geographic location for the CAD message and/or PSAP page. Thus, the situational awareness data can include building pre-plans, hydrant locations, GIS data, weather data, real-time traffic data and/or responder status. In some examples, the situational awareness can also identify specific first responders and/or a category of first responders that are needed for the emergency event. For instance, the situational awareness can provide information indicating that firefighters assigned to a particular fire station are to be deployed to the emergency event.

At 425, the data normalization server 318 generates a BDDO that encapsulates dispatch data from the CAD message and/or PSAP page, and the (augmented) situational awareness.

At 430, the data normalization server 318 provides an API call to the ATSC transport encoder 322 that includes parameters for injecting a portion of the data encapsulated in the BDDO into a broadcast stream. These parameters can include message control parameters such as data for selecting a particular antenna (broadcast antenna) controlled by the ATSC broadcaster 330 that corresponds to a particular geographic region. Additionally, in some examples, these parameters of the API call include the BDDO. In other examples, the BDDO can be sent in a designated API call without message control parameters. Responsive to the API call at 435, the ATSC transport encoder 322 encapsulates data in the BDDO (or some portion thereof) into a broadcast stream. At 440, the broadcast stream is provided to the ATSC broadcaster 330.

At 445, the ATSC broadcaster 330 encodes the broadcast stream into an ATSC broadcast signal. The broadcast signal can be a multi group broadcaster channel, such as the multi group broadcaster channel 200 of FIG. 1. Thus, the broadcast stream encodes a dispatch message based on information in the BDDO. At 450 the ATSC broadcaster 330 causes an antenna (specified in parameters of the API call from the normalization server 318) to propagate the ATSC broadcast signal in a signal that complies with at least the ASTC 3.0 standards. The ATSC broadcast signal is received by equipment configured to receive ATSC broadcast signals, including televisions, the ATSC stand-alone receiver 334 and the ATSC mobile dispatch receiver 338.

The ATSC stand-alone receiver 334 receives the ATSC broadcast signal that includes the multi group broadcaster channel. At 453, the ATSC stand-alone receiver 334 makes a determination as to whether the ATSC broadcast signal includes a new dispatch message. The determination can be made, for example, by the ATSC stand-alone receiver 334 examining L1 signaling and an LLS table of a PLP 0 (a synchronization PLP) of the multi group broadcaster channel. The L1 signaling can specify a dispatch PLP that is dedicated for dispatch messages. Additionally, the dispatch LLS table of the PLP 0 can identify dispatch messages that are in the dispatch PLP. The dispatch LLS table can include a table version. The ATSC stand-alone receiver 334 can be configured to determine that the multi group broadcaster channel does not include a new dispatch message if a current version number of the dispatch LLS table has not been incremented from a previous version number indicating that there are no new dispatch messages on the multi group broadcaster channel. If the ATSC stand-alone receiver 334 determines that the multi group broadcaster channel does not include a new dispatch message for the ATSC stand-alone receiver 334, the ATSC stand-alone receiver 334 can operate in a sleep mode, where the ATSC stand-alone receiver 334 is inhibited from further analysis of the ATSC broadcast signal to conserve battery life. Periodically and/or asynchronously, the ATSC stand-alone receiver 334 can wake up to reexamine the ATSC broadcast signal in a similar fashion.

Conversely, at 455 if the version number of the dispatch LLS table is incremented, the ATSC stand-alone receiver 334 operates in a dispatch mode. In the dispatch mode, the ATSC stand-alone receiver 334 can employ qual data in the dispatch PLP to determine if the dispatch message is destined for the ATSC dispatch receiver. If the qual data matches qual data provisioned in the ATSC stand-alone receiver 334, the ATSC stand-alone receiver 334 can determine that the dispatch messaged encoded in the multi group broadcaster channel is destined for the ATSC stand-alone receiver 334. The qual data of an encapsulated BDDO can include data identifying a particular entity (e.g., a fire station), IP addressing and/or port information.

If the determination at 455 indicates that the ATSC stand-alone receiver 334 is not a destination for the dispatch message (based on the qual data of the dispatch message), the ATSC stand-alone receiver 334 ignores the dispatch message and switches back to operating in the sleep mode, wherein the ATSC mobile dispatch receiver 338 is inhibited from further analysis of the ATSC broadcast signal to conserve battery life.

At 460, if the dispatch message is destined for the ATSC stand-alone receiver 334 (as determined at 455), the ATSC stand-alone receiver 334 can actuate (execute) an emergency operation. Execution of the emergency operation for the ATSC stand-alone receiver 334 includes outputting information on a display characterizing the dispatch message. The information can include an address, a timestamp and/or situational awareness augmented by the data normalization server 318.

At 463, the ATSC mobile dispatch receiver 338 also makes a determination as to whether the ATSC broadcast signal includes a new dispatch message. The determination at 463 is made in a similar manner as the determination at 453 as executed by the ATSC stand-alone receiver 334. Thus, if the ATSC mobile dispatch receiver 338 determines that a current version number of the dispatch LLS table of the multi group broadcaster channel has not been incremented from a previous version number, the ATSC mobile dispatch receiver 338 can determine that there are not new dispatch messages on the multi group broadcaster channel. In this situation, the ATSC mobile dispatch receiver 338 can operate in a sleep mode, where the ATSC mobile dispatch receiver 338 is inhibited from further analysis of the ATSC broadcast signal to conserve battery life. Periodically and/or asynchronously, the ATSC stand-alone receiver 334 can wake up to reexamine the ATSC broadcast signal in a similar fashion.

Conversely, at 465 if the version number of the dispatch LLS table is incremented, the ATSC mobile dispatch receiver 338 operates in a dispatch mode. In the dispatch mode, the ATSC mobile dispatch receiver 338 can employ qual data in the dispatch PLP to determine if the dispatch message is destined for the ATSC mobile dispatch receiver 338. If the qual data matches qual data provisioned in the ATSC mobile dispatch receiver 338, ATSC mobile dispatch receiver 338 can determine that the dispatch messaged encoded in the multi group broadcaster channel is destined for the ATSC mobile dispatch receiver 338. The qual data of an encapsulated BDDO can include data identifying a particular entity (e.g., a fire station), IP addressing and/or port information.

If the determination at 465 indicates that the ATSC mobile dispatch receiver 338 is not a destination for the dispatch message, the ATSC mobile dispatch receiver 338 ignores the dispatch message and switches back to operating in the sleep mode, wherein the ATSC mobile dispatch receiver 338 is inhibited from further analysis of the ATSC broadcast signal to conserve battery life, including the battery life of the mobile device 342.

If the dispatch message is destined for the ATSC mobile dispatch receiver 338 (as determined at 465), the ATSC mobile dispatch receiver 338 continues to operate in the dispatch mode, and at 470, the ATSC mobile dispatch receiver 338 actuates (executes) an emergency operation. The emergency operation for the ATSC mobile dispatch receiver 338 causes the ATSC mobile dispatch receiver 338 to provide the dispatch message to an application executing on the mobile device 342. In response to the dispatch message, at 475, the application executing on the mobile device 342 can augment the dispatch message with data retrieved from external sources, such as map data (e.g., turn-by-turn directions). At 480, the dispatch message, along with the augmented information is output by the mobile device 342.

At 485, the mobile device 342 can establish a communication channel with the data normalization server 318 that includes a dispatch confirmation message that the dispatch message had been received at the ATSC mobile dispatch receiver 338. In some examples, the mobile device 342 can also provide updated location information indicating that a user of the mobile device 342 is in route to a location identified in the dispatch message.

Figure 4:
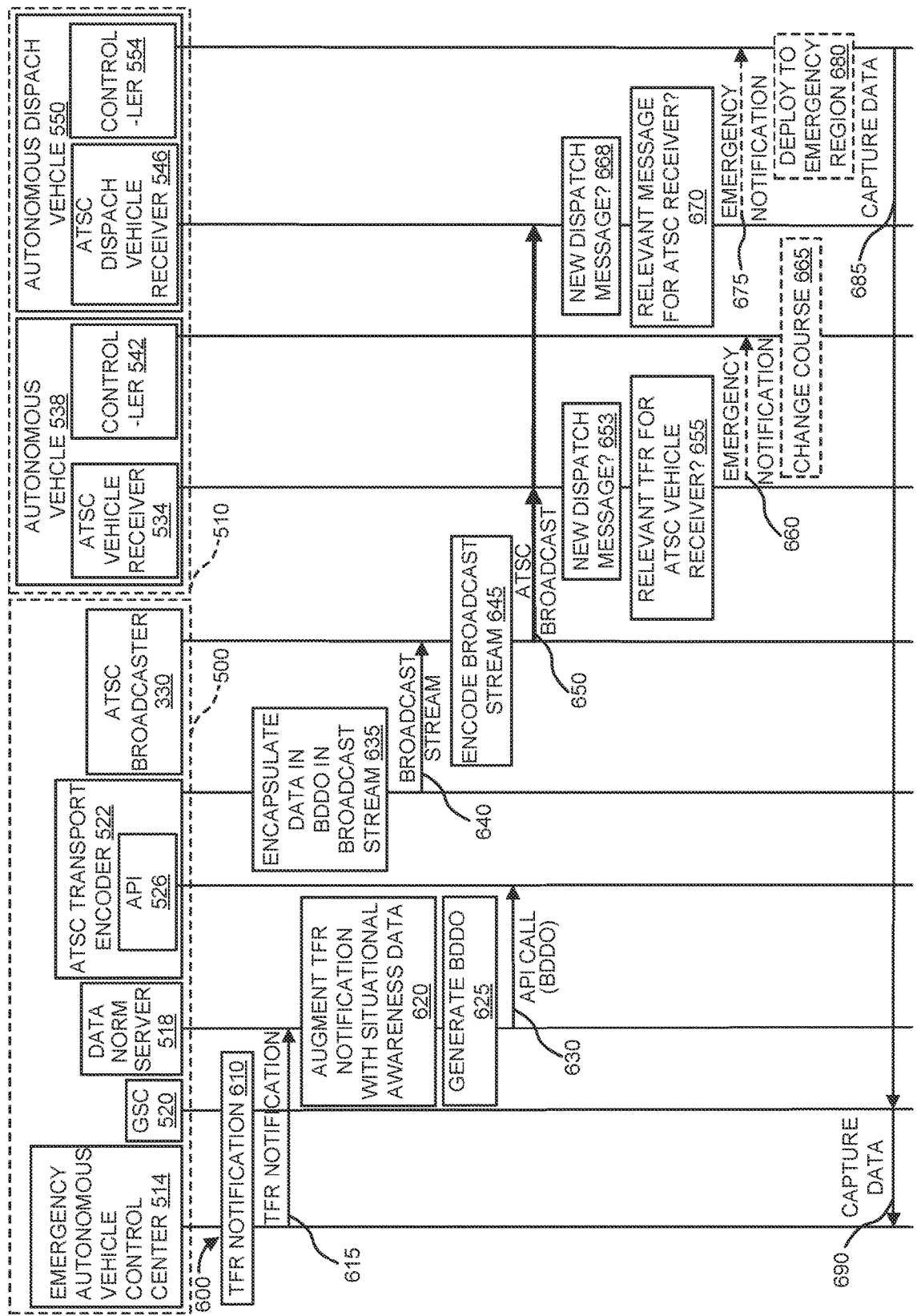
FIG. 4 illustrates another sequence diagram of a dispatch broadcast system that is employed to broadcast dispatch messages to ATSC dispatch receivers over an ATSC broadcast signal.

FIG. 4 illustrates another sequence diagram of a dispatch broadcast system 500 that is employed to broadcast dispatch messages to ATSC dispatch receivers 510 over an ATSC broadcast signal that conforms to at least the ATSC 3.0 standards. The dispatch broadcast system 500 and the ATSC dispatch receivers 510 in combination are employable to implement the system 100 of FIG. 1.

The dispatch broadcast system 500 includes an emergency autonomous vehicle control center 514, such as a UAS service supplier that is employable to implement a given emergency notification concentrator 132 of B number of emergency notification concentrators 132 of FIG. 1. The system 500 also includes a data normalization server 518 of the dispatch broadcast system 500 that is employable to implement the data normalization server 140 of FIG. 1. The emergency autonomous vehicle control center 514 also communicates with a ground station controller (GSC) 520 (e.g., a computing platform) that can be representative of multiple GSCs 520. The dispatch broadcast system 500 includes an ATSC transport encoder 522 that is employable to implement the ATSC transport encoder 156 of FIG. 1. The ATSC transport encoder 522 includes an API 526. The data normalization server 518 includes a ATSC interface module (e.g., the ATSC interface module 160 of FIG. 1) that generates API calls to the API 526 that cause the ATSC transport encoder 522 to execute specific operations for encapsulating data in a broadcast stream that is broadcast by an ATSC broadcaster 530, which is employable to implement the ATSC broadcaster 108 of FIG. 1.

The ATSC dispatch receivers 510 include an ATSC vehicle receiver 534 that is employable to implement a given ATSC vehicle receiver 176 of the P number of ATSC vehicle receivers 176 of FIG. 1. The ATSC vehicle receiver 534 is installed on an autonomous vehicle 538, such as one of the P number of vehicles 178 of FIG. 1. The ATSC vehicle receiver 534 communicates with a controller 542 of the autonomous vehicle 538. In some examples, the ATSC vehicle receiver 534 and the controller 542 are integrated on the same device. In other examples, the ATSC vehicle receiver 534 and the controller 542 are separate physical devices that communicate over a bus of the autonomous vehicle 538.

The ATSC dispatch receivers 510 also include an ATSC dispatch vehicle receiver 546 that is employable to implement a given ATSC dispatch vehicle receiver of the F number of ATSC dispatch vehicle receivers 182 of FIG. 1. The ATSC dispatch vehicle receiver 546 is installed in an autonomous dispatch vehicle 550, such as one of the dispatch vehicles 184 of the F number of the dispatch vehicles 184 of FIG. 1. The ATSC dispatch vehicle receiver 546 communicates with a controller 554 of the autonomous dispatch vehicle 550. In some examples, the ATSC dispatch vehicle receiver 546 and the controller 554 are integrated on the same device. In other examples, the ATSC dispatch vehicle receiver 546 and the controller 554 are separate physical devices that communicate over a bus of the autonomous dispatch vehicle 550.

The dispatch broadcast system 500 and the ATSC dispatch receivers 510 are employable to implement a method 600 for broadcasting a dispatch message to the ATSC vehicle receiver 534 and the ATSC dispatch vehicle receiver 546 using an ATSC broadcast signal, such as an ATSC 3.0 broadcast signal. At 610, the emergency autonomous vehicle control center 514 generates an emergency notification that is implemented as a temporary flight restriction (TFR) notification for a specific geographic area. More particularly, the TFR notification can include location data characterizing a protected boundary of a geographic region, which can be referred to as a TFR region. The TFR notification can also include an event location that is within the TFR region. The event location can be, for example, a location of an emergency event. At 615, the TFR notification is provided to the data normalization server 518. In some examples, the TFR notification can be implemented as an emergency event notification.

In response, at 620, the data normalization server 318 determines a geographical region of an emergency event characterized in the TFR notification. Also at 620, the data normalization server 518 can augment the TFR notification with situational awareness data. The situational awareness data can be, for example, information characterizing the event location (e.g., building height), weather data and/or nature of the event corresponding to the TFR notification. In other examples, the augmenting can be omitted.

At 625, the data normalization server 318 generates a BDDO that encapsulates the data from the TFR notification, and the (augmented) situational awareness, if present. The BDDO also includes qual data that specifies which ATSC dispatch receivers 510 are a destination for the TFR notification encoded in the broadcast stream. Thus, the BDDO encodes a dispatch message for broadcasting to the ATSC dispatch receivers 510.

At 630, the data normalization server 318 generates an API call that is provided to the API 526 of the ATSC transport encoder 522. The API call includes parameters for injecting a portion of the data encapsulated in the BDDO into a broadcast stream. These parameters can include message control parameters. Additionally, in some examples, these parameters of the API call include the BDDO. In other examples, the BDDO can be sent in a designated API call without message control parameters. Responsive to the API call and the BDDO from the data normalization server 518, at 635, the ATSC transport encoder 522 encapsulates data in the BDDO (or some portion thereof) into a broadcast stream. At 640, the broadcast stream is provided to the ATSC broadcaster 530.

At 645, the ATSC broadcaster 530 encodes the broadcast stream into an ATSC broadcast signal. The broadcast signal can be a multi group broadcaster channel, such as the multi group broadcaster channel 200 of FIG. 1. Thus, the broadcast stream encodes a TFR notification (a dispatch message) based on information in the BDDO. At 650, the ATSC broadcaster 530 causes an antenna (specified in parameters of the API call) to propagate a ATSC broadcast signal that complies with at least the ASTC 3.0 standards. The ATSC broadcast signal is received by equipment configured to receive ATSC broadcast signals, including televisions, the ATSC vehicle receiver 534 and the ATSC dispatch vehicle receiver 546.

The ATSC vehicle receiver 534 receives the ATSC broadcast signal that includes the multi group broadcaster channel. At 653, the ATSC vehicle receiver 534 makes a determination as to whether the ATSC broadcast signal includes a new dispatch message (or a new TFR notification, more specifically). The determination can be made, for example, by the ATSC vehicle receiver 534 examining L1 signaling and an LLS table of a PLP 0 (a synchronization PLP) of the multi group broadcaster channel. The L1 signaling can specify a dispatch PLP that is dedicated for dispatch messages. Additionally, the dispatch LLS table of the PLP 0 can identify dispatch messages that are in the dispatch PLP. The dispatch LLS table can include a table version. The ATSC vehicle receiver 534 can be configured to determine that the multi group broadcaster channel does not include a new dispatch message if a current version number of the dispatch LLS table has not been incremented from a pervious version number indicating that there are not new dispatch messages on the multi group broadcaster channel. If the ATSC vehicle receiver 534 determines that the multi group broadcaster channel does not include a new dispatch message, the ATSC vehicle receiver 534 operates in a sleep mode, wherein the ATSC vehicle receiver 534 is inhibited from further analysis of the ATSC broadcast signal to conserve battery life. Periodically and/or asynchronously, the ATSC vehicle receiver 534 can wake up to reexamine the ATSC broadcast signal in a similar fashion.

Conversely, if the version number of the dispatch LLS table is incremented, at 655, the ATSC vehicle receiver 534 can operate in a dispatch mode, and employ location data for the TFR in the BDDO included the dispatch PLP to determine if the TFR notification is destined for the ATSC vehicle receiver 534. If location data included in the BDDO indicates that the TFR region does not cover a current or predicted future location (based on a trajectory) of the autonomous vehicle 538, the ATSC vehicle receiver 534 can ignore the TFR encoded in the BDDO and return to operating in the sleep mode to conserve battery life. If location data included in the BDDO indicates that the TFR region covers a current or predicted future location (based on a trajectory) of the autonomous vehicle 538, the ATSC vehicle receiver 534 determines that the TFR encoded in the BDDO is destined for the ATSC vehicle receiver 534.

At 660, in the dispatch mode, if the dispatch message is destined for the ATSC vehicle receiver 534 (as determined at 655), the ATSC vehicle receiver 534 can actuate (execute) an emergency operation. The emergency operation for the ATSC vehicle receiver 534 can cause the ATSC vehicle receiver 534 to provide the controller 542 of the autonomous vehicle 538 with an emergency notification. The information can include an address, a timestamp and/or situational awareness augmented by the data normalization server 518. At 665, continuing in the dispatch mode, responsive to the emergency notification, the controller 542 can generate instructions that cause the autonomous vehicle 538 to change course. The change of course can cause the autonomous vehicle 538 to evacuate the TFR region (if the autonomous vehicle 538 is in the TFR region) or to change a trajectory to avoid the TFR region (if the autonomous vehicle 538 is predicted to enter the TFR region).

At 668, the ATSC dispatch vehicle receiver 546 makes a determination as to whether the ATSC broadcast signal includes a new dispatch message (or a new TFR notification, more specifically). The determination can be made, for example, by the ATSC dispatch vehicle receiver 546 examining L1 signaling and an LLS table of a PLP 0 (a synchronization PLP) of the multi group broadcaster channel. The L1 signaling can specify a dispatch PLP that is dedicated for dispatch messages. Additionally, the dispatch LLS table of the PLP 0 can identify dispatch messages that are in the dispatch PLP. The dispatch LLS table can include a table version. The ATSC vehicle receiver 534 can be configured to determine that the multi group broadcaster channel does not include a new dispatch message if a current version number of the dispatch LLS table has not been incremented from a pervious version number indicating that there are not new dispatch messages on the multi group broadcaster channel.

If the ATSC dispatch vehicle receiver 546 determines that the multi group broadcaster channel does not include a new dispatch message, the ATSC dispatch vehicle receiver 546 operates in a sleep mode, wherein the ATSC dispatch vehicle receiver 546 is inhibited from further analysis of the ATSC broadcast signal to conserve battery life. Periodically and/or asynchronously, the ATSC dispatch vehicle receiver 546 can wake up to reexamine the ATSC broadcast signal in a similar fashion.

Conversely, if the version number of the dispatch LLS table is incremented, the ATSC dispatch vehicle receiver 546 can operate in a dispatch mode, at 670, the ATSC dispatch vehicle receiver 546 can employ qual data in the dispatch PLP to determine if the TFR notification (a dispatch message) is destined for the ATSC dispatch vehicle receiver 546. If the qual data matches qual data provisioned in the ATSC dispatch vehicle receiver 546, the ATSC dispatch vehicle receiver 546 can determine that the dispatch messaged encoded in the multi group broadcaster channel is destined for the ATSC dispatch vehicle receiver 546. The qual data of an encapsulated BDDO can include data identifying a particular entity (e.g., a fire station), IP addressing and/or port information. If the determination at 670 indicates that the ATSC dispatch vehicle receiver 546 is not a destination for the TFR notification, the ATSC dispatch vehicle receiver 546 can ignore the TFR notification (a dispatch message) and return to operating in the sleep mode, where the ATSC dispatch vehicle receiver goes back to sleep to conserve battery life, including the battery life of the autonomous dispatch vehicle 550.

Conversely at 675, if the TFR notification is destined for the ATSC dispatch vehicle receiver 546 (as determined at 670), the ATSC dispatch vehicle receiver 546 continues to operate in the dispatch mode, wherein the ATSC dispatch vehicle receiver 546 can actuate (execute) an emergency operation. The emergency operation for the ATSC dispatch vehicle receiver 546 can cause the ATSC dispatch vehicle receiver 546 to provide an emergency notification to the controller 554 based on the TFR notification.

Responsive to the emergency notification, at 680, the controller 554 can generate instructions that cause the autonomous dispatch vehicle 550 to deploy to the event location within the TFR region. Additionally, the controller 554 can generate instructions that cause the autonomous dispatch vehicle 550 to execute particular operations (e.g., record video and/or audio) responsive to arrival at the event location.

Additionally, at 685, the controller 554 can provide capture data to the GSC 520. The capture data can include, for example, data captured by the autonomous dispatch vehicle 550 (e.g., video and/or audio data, location data, etc.) and or near the event location. In response to the capture data, at 690, the GSC 520 can provide the capture data to the emergency autonomous vehicle control center 514.

By employment of the method 600, certain autonomous vehicles (e.g., the autonomous vehicle 538) can be configured to avoid or evacuate the TFR region. Additionally, other autonomous vehicles, such as those deployable for an emergency event, including the autonomous dispatch vehicle 550 are deployed to the event location within the TFR region. Additionally, in such a situation, both the autonomous vehicle 538 and the autonomous dispatch vehicle 550 are equipped with an ATSC receiver, namely the ATSC vehicle receiver 534 and the ATSC dispatch vehicle receiver 546 respectively that receives ATSC broadcast signals that include the TFR notification and other types of dispatch messages.

Moreover, as is illustrated, the dispatch broadcast system 500 and the dispatch broadcast system 300 of FIG. 3 have similar architecture. Thus, in some examples, the data normalization server 518 and the data normalization server 318 of FIG. 3 can be implemented with the same server, such as the data normalization server 140 of FIG. 1. In other examples, the data normalization server 518 and the data normalization server 318 of FIG. 3 are implemented with different servers (e.g., different physical servers or different virtual servers).

Figure 5:
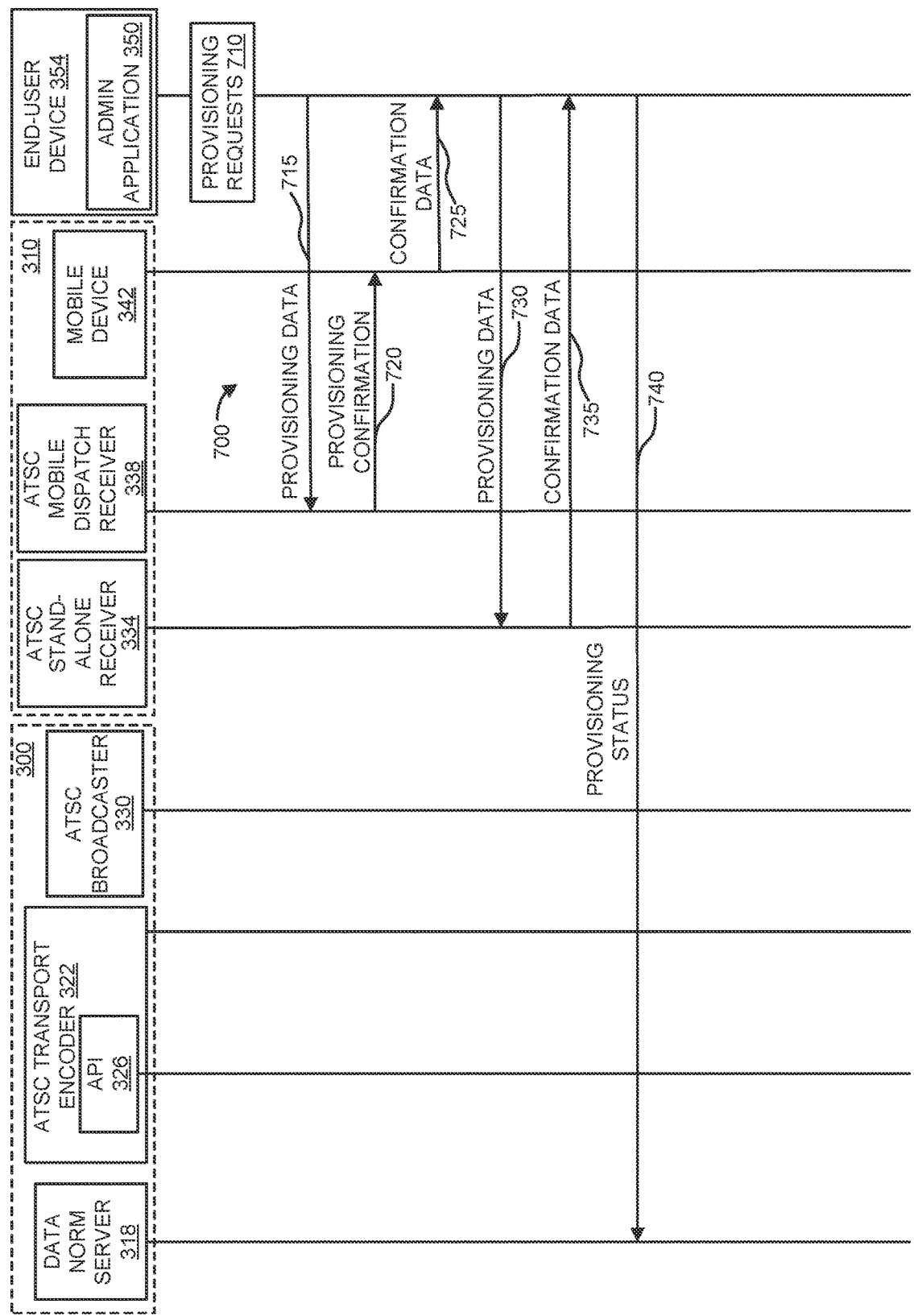
FIGS. 5 and 6 illustrate a method for provisioning an ATSC dispatch receiver and an ATSC mobile dispatch receiver.
Figure 6:
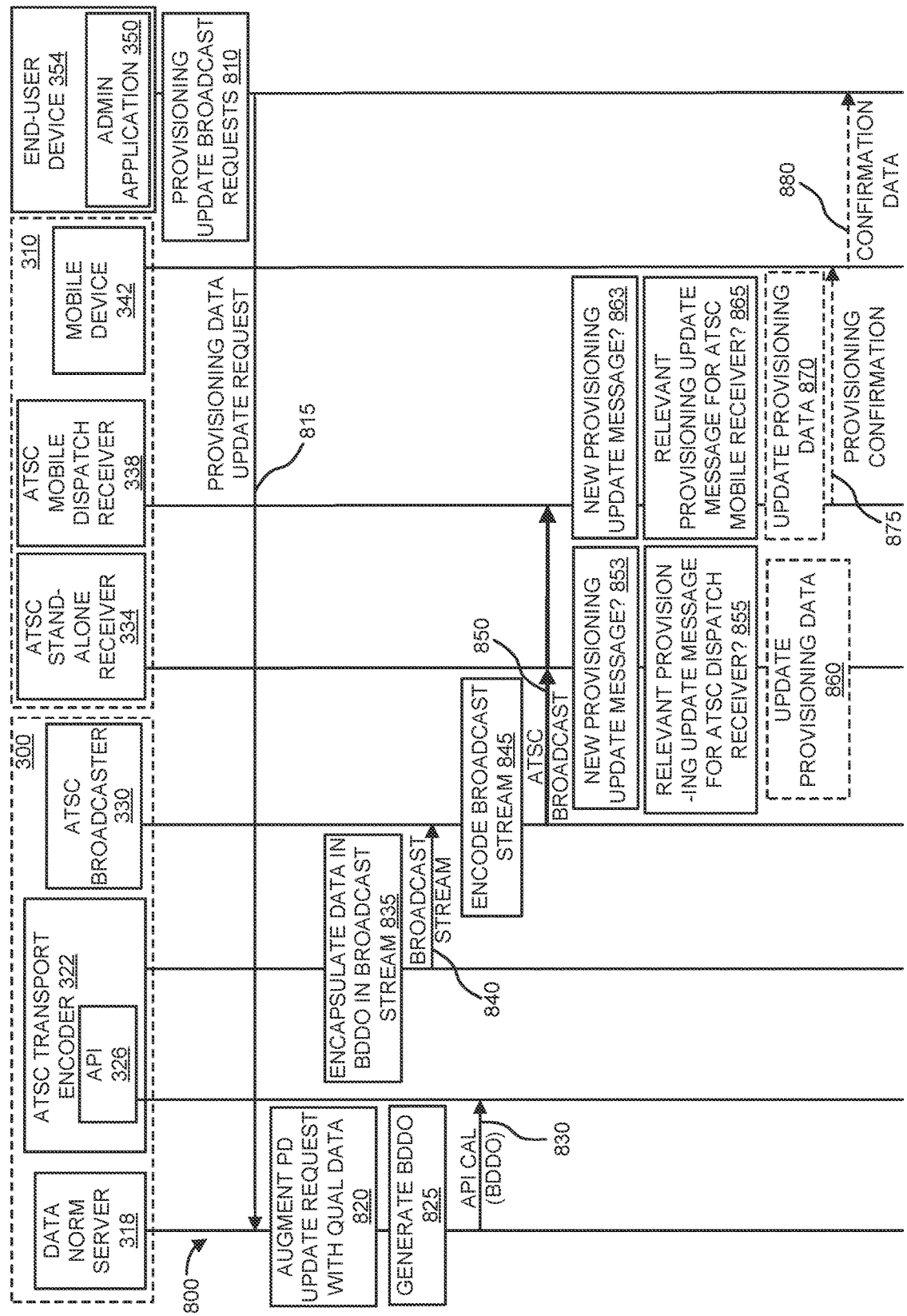

FIGS. 5 and 6 illustrate a sequence diagram for provisioning the ATSC dispatch receivers 310 illustrated in FIG. 3. For purposes of simplification of explanation, FIGS. 3, 5 and 6 employ the same reference numbers to denote the same structures. The ATSC dispatch receivers 310 can be provisioned with a combination of the dispatch broadcast system 300 and an administration application 350 executing on an end-user device 354. The end-user device 354 can be implemented with a computing platform, such as a workstation, a laptop computer, a tablet computer, a mobile computer (e.g., a smartphone), etc. The ATSC dispatch receivers 310 include the ATSC stand-alone receiver 334, the ATSC mobile dispatch receiver 338 and the mobile device 342 illustrated in FIG. 3.

The dispatch broadcast system 300 and the mobile device 342 are employable to implement a method 700 for provisioning the ATSC dispatch receivers 310. The method 700 can be executed for an initial provisioning of the ATSC mobile dispatch receiver 338 and the ATSC stand-alone receiver 334 of the ATSC dispatch receivers 310. At 710, the administration application 350 generates provisioning requests for the ATSC mobile dispatch receiver 338 and the ATSC stand-alone receiver 334. In the method 700, it is presumed that the end-user device 354 are in relatively close physical proximity such that the end-user device 354 communicates with the ATSC stand-alone receiver 334 and the ATSC mobile dispatch receiver 338 through a direct communication link, such as a Bluetooth wireless channel, a wireless local area network (WLAN) or a wired connection.

At 715, the administration application 350 provides provisioning data to the ATSC mobile dispatch receiver 338. The provisioning data can include, for example, assignment of an Internet Protocol (IP) address, an updated digital certificate(s), LLS tables for specific applications and qual data for filtering dispatch messages, such as state, county, fire department ID, a device ID and/or a user ID. The qual data can also include a skill set, a time domain, a geo-fence, etc. At 720, the ATSC mobile dispatch receiver 338 can provide the mobile device 342 with a provisioning confirmation. Alternatively, in some examples, the provisioning confirmation can be returned to the administration application 350. Responsive to the provisioning confirmation, at 725, the mobile device 342 can provide confirmation data to the administration application 350, which can be employed to confirm that the ATSC mobile dispatch receiver 338 has been properly provisioned.

At 730, the administration application 350 provides provisioning data to the ATSC stand-alone receiver 334. The provision data can include similar data as the provisioning data provided to the ATSC mobile dispatch receiver 338. At 735, the ATSC mobile dispatch receiver 338 can provide confirmation data to the administration application 350, which can be employed to confirm that the ATSC stand-alone receiver 334 has been properly provisioned. At 740, the administration application 350 provides the data normalization server 318 with provisioning status characterizing the provisioning data written to the ATSC stand-alone receiver 334 and the ATSC mobile dispatch receiver 338 (and/or other provision data written to other ATSC dispatch receivers 310).

By employment of the method 700, the ATSC stand-alone receiver 334 and the ATSC mobile dispatch receiver 338 are provisioned to receive dispatch messages, such as described with respect to FIGS. 1 and 3.

FIG. 6 illustrates a method 800 for updating provisioning of the ATSC stand-alone receiver 334 and the ATSC mobile dispatch receiver 338. The method 800 is executed for example, in response to re-assignment of the ATSC stand-alone receiver 334 and/or the ATSC mobile dispatch receiver 338 to a different geographic region and/or user.

The method 800 can be executed in response to execution of the method 700 of FIG. 4. Also, the method 400 of FIG. 3 can be executed (multiple times) between execution of the method 700 and the method 800. In the method 800, it is presumed that the end-user device 354, the ATSC stand-alone receiver 334 and the ATSC mobile dispatch receiver 338 are physically dispersed (e.g., deployed in the field). At 810, the administration application 350 generates provision update broadcast requests for the ATSC stand-alone receiver 334 and the ATSC mobile dispatch receiver 338 of the ATSC dispatch receivers 310. The provisioning data update request can include an updated LLS table and/or updated qual data for filtering dispatch messages.

At 815, the provisioning data update request is provided to the data normalization server 318 (e.g., through a network, such as the Internet). In response to the provisioning data update request, the data normalization server 318, at 820 augments the provisioning data (PD) with qual data, in some examples. At 825, the data normalization server 318 generates a BDDO that encapsulates the data from the provisioning data update request, and the augmented data. The BDDO also includes qual data that specifies which ATSC dispatch receivers 310 are a destination for the dispatch messaged encoded in the broadcast stream. The BDDO can include encrypted data that is only decryptable by a key included on the ATSC stand-alone receiver 334 and/or the ATSC mobile dispatch receiver 338.

At 830, the data normalization server 318 generates an API call that is provided to the API 326 of the ATSC transport encoder 322. The API call includes parameters for injecting a portion of the data encapsulated in the BDDO into a broadcast stream. These parameters can include message control parameters. Additionally, in some examples, these parameters of the API call include the BDDO. In other examples, the BDDO can be sent in a designated API call without message control parameters. Responsive to the API call and the BDDO from the data normalization server 518, at 835, the ATSC transport encoder 322 encapsulates data in the BDDO (or some portion thereof) into a broadcast stream. At 840, the broadcast stream is provided to the ATSC broadcaster 330.

At 845, the ATSC broadcaster 330 encodes the broadcast stream into an ATSC broadcast signal. The broadcast signal can be a multi group broadcaster channel, such as the multi group broadcaster channel 200 of FIG. 2. Thus, the broadcast stream encodes updated provisional data based on information in the BDDO. At 850 the ATSC broadcaster 330 causes an antenna (specified in the API call) to propagate the ATSC broadcast signal that complies with at least the ASTC 3.0 standard. The ATSC broadcast signal is received by equipment configured to receive ATSC broadcast signals, including televisions, the ATSC stand-alone receiver 334 and the ATSC mobile dispatch receiver 338.

The ATSC stand-alone receiver 334 receives the ATSC broadcast signal that includes the multi group broadcaster channel. At 853, the ATSC stand-alone receiver 334 makes a determination as to whether the ATSC broadcast signal includes a new provisioning update message. The determination can be made, for example, by the ATSC stand-alone receiver 334 examining L1 signaling and an LLS table of a PLP 0 of the multi group broadcaster channel. The L1 signaling can specify a provisioning PLP (which can be separate from the dispatch PLP 224 of FIG. 2) that is dedicated for provisioning data. Additionally, a provisioning LLS table of the PLP 0 can identify provisioning update messages that are in the provisioning PLP. The provisioning LLS table can include a table version. The ATSC stand-alone receiver 334 can be configured to determine that the multi group broadcaster channel does not include a new provisioning update message if a current version number of the provisioning LLS table has not been incremented from a previous version number indicating that there are not new provisioning update messages on the multi group broadcaster channel. If the ATSC stand-alone receiver 334 determines that the multi group broadcaster channel does not include a new provisioning update message, the ATSC stand-alone receiver 334 can operate in a sleep mode, wherein the ATSC stand-alone receiver 334 ceases further analysis of the ATSC broadcast signal to conserve battery life. Periodically and/or asynchronously, the ATSC stand-alone receiver 334 can wake up to reexamine the ATSC broadcast signal in a similar fashion.

Conversely, if the version number of the provisioning LLS table is incremented, at 855 the ATSC stand-alone receiver 334 can operate in a provisioning mode, and the ATSC dispatch receiver employs qual data in the provisioning PLP to determine if the dispatch message is destined for the ATSC dispatch receiver. If the qual data matches qual data provisioned in the ATSC stand-alone receiver 334 the ATSC stand-alone receiver 334 can determine that the provisioning message encoded in the multi group broadcaster channel is destined for the ATSC stand-alone receiver 334. The qual data of an encapsulated BDDO can include data identifying a particular entity (e.g., a fire station), IP addressing and/or port information.

At 860, if the provisioning update message is destined for the ATSC stand-alone receiver 334 (as determined at 855), the ATSC stand-alone receiver 334 can update provisioning data stored at the ATSC stand-alone receiver 334. The information can include, for example, the qual data, an updated LLS table and/or filtering data for selecting future dispatch messages.

At 863, the ATSC mobile dispatch receiver 338 also makes a determination as to whether the ATSC broadcast signal includes a new provisioning update message. The determination at 863 is made in a similar manner as the determination at 853 as executed by the ATSC mobile dispatch receiver 338. Thus, if the ATSC mobile dispatch receiver 338 determines that a current version number of the provisioning LLS table of the multi group broadcaster channel has not been incremented from a previous version number, the ATSC mobile dispatch receiver 338 can determine that that there are not new provisioning update messages on the multi group broadcaster channel. In this situation, the ATSC mobile dispatch receiver 338 can operate in a sleep mode, where the ATSC mobile dispatch receiver 338 is inhibited from further analysis of the ATSC broadcast signal to conserve battery life. Periodically and/or asynchronously, the ATSC stand-alone receiver 334 can wake up to reexamine the ATSC broadcast signal in a similar fashion.

At 865 the ATSC stand-alone receiver 334 can operate in a provisioning mode, and the ATSC dispatch receiver employs qual data in the provisioning PLP to determine if the provisioning update message is destined for the ATSC dispatch receiver. If the qual data matches qual data provisioned in the ATSC stand-alone receiver 334 the ATSC stand-alone receiver 334 can determine that the provisioning message encoded in the multi group broadcaster channel is destined for the ATSC stand-alone receiver 334. The qual data of an encapsulated BDDO can include data identifying a particular entity (e.g., a fire station), IP addressing and/or port information.

If the determination at 865 indicates that the ATSC mobile dispatch receiver 338 is not a destination for the dispatch message, the ATSC mobile dispatch receiver 338 ignores the provisioning update message and returns to operating in the sleep mode to conserve battery life, including the battery life of the mobile device 342. Conversely, at 870, if the dispatch message is destined for the ATSC mobile dispatch receiver 338 (as determined at 465), the ATSC mobile dispatch receiver 338 can update provisioning data stored at the ATSC mobile dispatch receiver 338 in a similar manner to the operations executed by the ATSC stand-alone receiver 334 at 850. Additionally, at 875, the ATSC mobile dispatch receiver 338 can provide a provisioning confirmation to the mobile device 342 indicating that the provisioning data of the ATSC mobile dispatch receiver 338 has been updated. At 880, the mobile device 342 can provide the administration application 350 with confirmation data to indicate that the provisioning data ATSC mobile dispatch receiver 338 has been updated to fulfill the provisioning update broadcast request.

Figure 7:
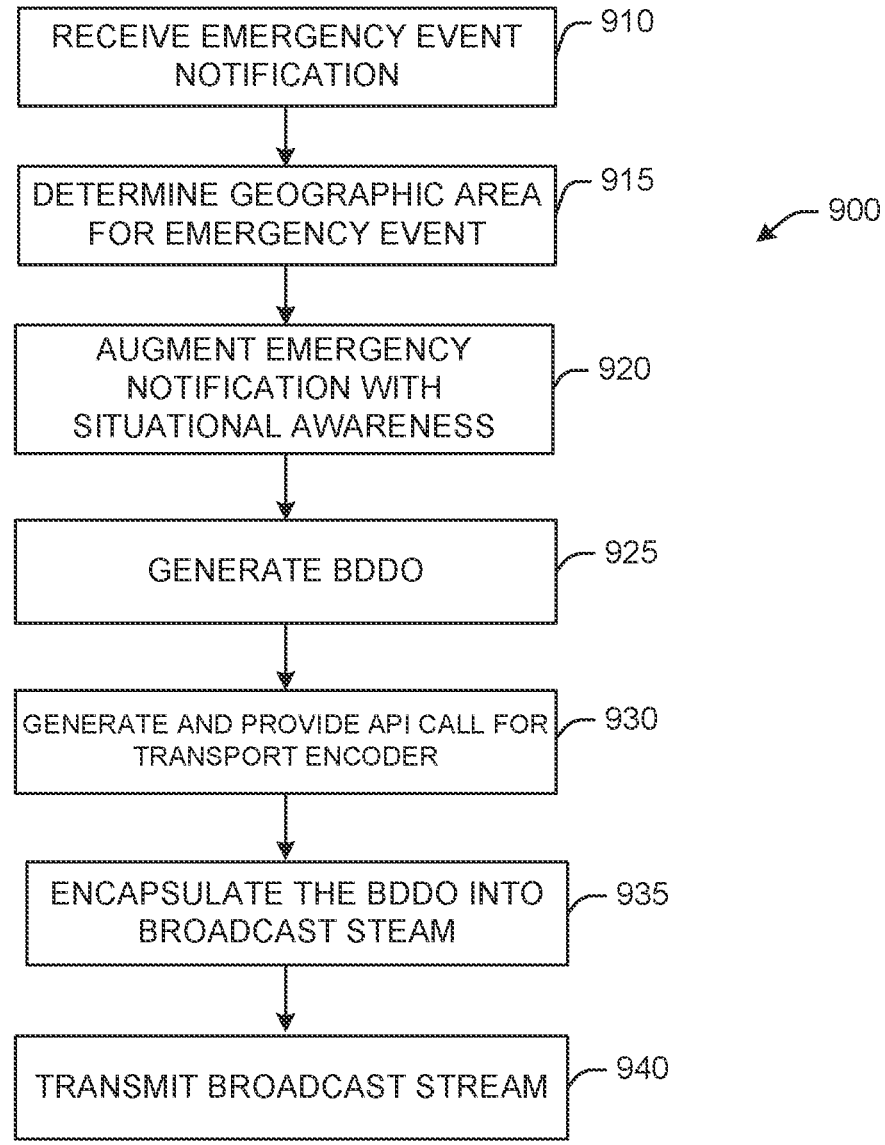
FIG. 7 illustrates a flowchart of an example method for broadcasting a dispatch message through a ATSC broadcast signal.

FIG. 7 illustrates a flowchart of an example method 900 for broadcasting a dispatch message (e.g., a page) through a ATSC broadcast signal, such as an ATSC signal conforming to at least the ATSC 3.0 standard. The method 900 could be implemented with the data normalization server 140 operating on the computing platform 116 and the ATSC transport encoder 156 of FIG. 1.

At 910, the data normalization server receives an emergency event notification from a regional emergency notification concentrator (an emergency notification concentrator 132 of FIG. 1). The emergency notification can be, for example, a CAD/PSAP page, a TFR notification, etc. The particular type and format of the emergency notification varies based on the type of regional emergency notification concentrator employed.

At 915, the data normalization server determines a geographical region of an emergency event responsive to the emergency notification from a regional emergency notification concentrator (e.g., a first emergency notification concentrator 132 of FIG. 1). At 920, the data normalization server augments the emergency notification with situational awareness data for the emergency event to provide an augmented emergency notification. The situational awareness can be, for example, map data, data related to building information, patient information, weather data, etc. The particular type of situational awareness augmented by the data normalization server varies based on a nature of the emergency event notification.

At 925, the data normalization server generates a BDDO based on the augmented emergency notification. At 930 the data normalization server generates an API call that is provided to the API of the ATSC transport encoder 522. The API call includes parameters for injecting a portion of the data encapsulated in the BDDO into a broadcast stream. These parameters can include message control parameters. Additionally, in some examples, these parameters of the API call include the BDDO. In other examples, the BDDO can be sent in a designated API call without message control parameters. The message control parameters can include characterizing how often a dispatch message is repeated (e.g., a repetition rate), where to send the dispatch message (state, region, local), a selected antenna for broadcasting, priority of the dispatch message, an adjustment made based on a number of pages at any given time and/or a request to for modification and/or conditional adjustments based on traffic.

At 935, responsive to the API call and the BDDO from the data normalization server, the ATSC transport encoder encapsulates data of the BDDO (or some portion thereof) in a broadcast stream for an ATSC broadcaster. Parameters for the encapsulation are specified in the API call included in the API call from the data normalization server. At 940, the ATSC transport encoder transmits the broadcast stream to the ATSC broadcaster. The ATSC broadcaster broadcasts a plurality of channels, and the plurality of channels comprises a dispatch channel with the data of the BDDO in response to receiving the ATSC broadcast stream.

Figure 8:
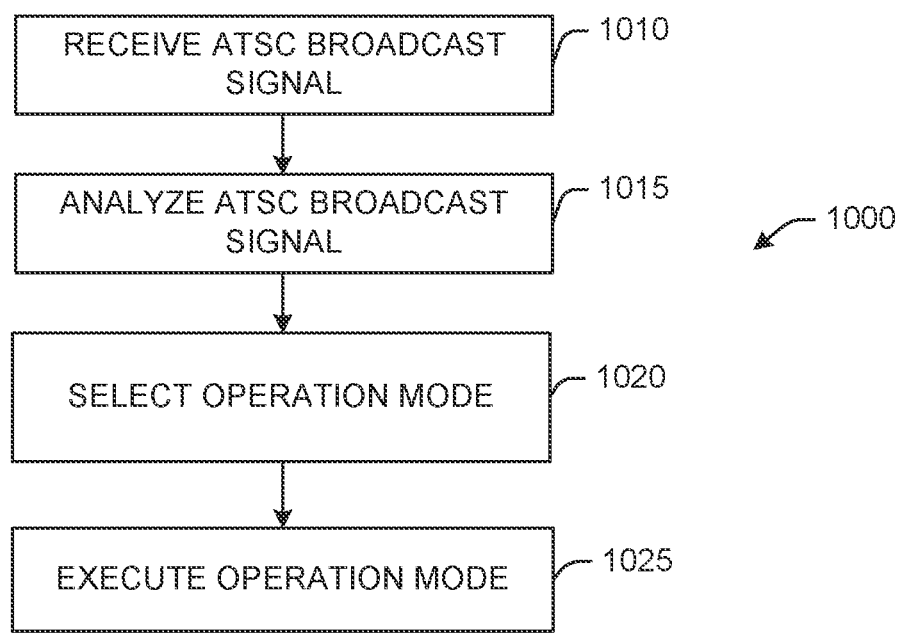
FIG. 8 illustrates a flowchart of an example method for processing a dispatch message received through a ATSC broadcast signal.

FIG. 8 illustrates a flowchart of an example method 1000 for processing a broadcasting dispatch message (e.g., a page) received through a ATSC broadcast signal, such as an ATSC signal conforming to at least the ATSC 3.0 standard. The method 1000 could be implemented with one of the ATSC dispatch receivers 188 of FIG. 1.

At 1010, the ATSC dispatch receiver receives an ATSC broadcast signal. The ATSC broadcast signal includes signaling characterizing content of a plurality of channels. A subset of the plurality of channels includes encoded video and audio data and a dispatch channel of the plurality of channels includes dispatch messages. At 1015, the ATSC dispatch receiver analyzes a low level signaling (LLS) table for the dispatch channel to determine if a dispatch message has been added to the ATSC broadcast signal. At 1020, the ATSC receiver selects a mode of operation of a set of modes of operation based on the analyzing. The set of modes of operation include a sleep mode of operation if a version of the LLS table for the dispatch channel has not changed from a previous version. The set of modes of operation also include a dispatch mode of operation in response to detecting a change in the version number of the LLS table for the dispatch channel. In the dispatch mode of operation, the dispatch messages not destined for the ATSC receiver are ignored and an emergency operation is actuated (executed) in response determining that a particular dispatch message of the dispatch messages is destined for the ATSC receiver. At 1025, the selected operation mode is executed.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An Advanced Television Systems Committee (ATSC) receiver comprising a controller with embedded instructions for executing operations, the operations comprising:

receiving an ATSC broadcast signal, the ATSC broadcast signal including signaling characterizing content of a plurality of channels, wherein a subset of the plurality of channels includes encoded video and audio data and a dispatch channel of the plurality of channels includes dispatch messages, wherein the dispatch channel is a dedicated physical layer pipe (PLP) for the dispatch messages and the dispatch channel has a different bitrate than remaining channels in the plurality of channels;

analyzing a low level signaling (LLS) table for the dispatch channel to determine whether a dispatch message has been added to the ATSC broadcast signal;

selecting a mode of operation of a set of modes of operation based on the analyzing, the set of modes of operation comprising:

a sleep mode of operation if a version of the LLS table for the dispatch channel has not changed from a previous version; and a dispatch mode of operation in response to detecting a change in the version of the LLS table for the dispatch channel, wherein in the dispatch mode of operation, dispatch messages not destined for the ATSC receiver are ignored and an emergency operation is actuated in response determining that a particular dispatch message of the dispatch messages is destined for the ATSC receiver; and executing, in response to the selecting, the selected mode of operation.

2. The ATSC receiver of claim 1, a synchronization physical layer pipe (PLP) embedded in the ATSC broadcast signal identifies the dispatch channel.

3. The ATSC receiver of claim 2, wherein qualifying data included in the dispatch channel for the particular dispatch message identifies a subset of network addresses assigned to a region, such that the ATSC receiver ignores the particular dispatch message in response to the ATSC receiver being outside the subset of network addresses assigned to the region and actuates the emergency operation in response to the ATSC receiver being assigned a network address included in the subset of network addresses assigned to the region.

4. The ATSC receiver of claim 2, wherein actuation of the emergency operation causes the controller of the ATSC receiver to execute operations to wirelessly send the particular dispatch message to an application executing on a mobile computing device, wherein the application outputs information characterizing an emergency event in response to receiving the particular dispatch message.

5. The ATSC receiver of claim 4, wherein the application queries an external service for information about a region characterized in the particular dispatch message in response to receiving the particular dispatch message.

6. The ATSC receiver of claim 2, further comprising a display, and actuation of the emergency operation comprises outputting information on the display for an emergency event characterized in the particular dispatch message.

7. The ATSC receiver of claim 2, wherein actuation of the emergency operation causes the controller to send an emergency event notification to a controller on an autonomous vehicle, and the autonomous vehicle evacuates a region for the emergency event in response to the emergency event notification.

8. The ATSC receiver of claim 2, wherein actuation of the emergency operation causes the ATSC receiver to send an emergency event notification to a controller on an emergency autonomous vehicle, and the emergency autonomous vehicle is deployed to a location for an emergency event.

9. The ATSC receiver of claim 1, wherein the sleep mode causes the ATSC receiver to inhibit analysis of the ATSC broadcast signal to conserve battery life.

10. The ATSC receiver of claim 1, wherein the dispatch channel identifies user datagram (UDP) port addresses for dispatch messages encoded in the dispatch channel.

11. The ATSC receiver of claim 1, wherein the ATSC broadcast signal has a frequency between 54 megahertz and 216 megahertz or between 470 megahertz and 698 megahertz.

12. The ATSC receiver of claim 1, wherein the ATSC receiver is configured to update provisioning data stored in the ATSC receiver responsive to detecting a provisioning update message encoded in the ATSC broadcast signal that is destined for the ATSC receiver.

13. The ATSC receiver of claim 1, wherein the dispatch channel has a different modulation scheme than the remaining channels of the plurality of channels encoded in the broadcast signal.

14. The ATSC receiver of claim 1, wherein the ATSC receiver is a stand-alone receiver that includes a text display.

15. The ATSC receiver of claim 1, wherein the emergency operation causes the ATSC receiver to provide the dispatch message to an application executing on a mobile device, and the application executing on the mobile device augments the dispatch message with data retrieved from external sources responsive to receiving the dispatch message.

16. The ATSC receiver of claim 1, wherein the dispatch message includes internet protocol (IP) addressing that enables the ATSC receiver to determine whether the dispatch message is destined for the ATSC receiver or not.

17. A method for processing an Advanced Television Systems Committee (ATSC) broadcast signal by an ATSC receiver comprising a controller with embedded instructions for executing the method, the method comprising:
 receiving an ATSC broadcast signal, the ATSC broadcast signal including signaling characterizing content of a plurality of channels, wherein a subset of the plurality of channels includes encoded video and audio data and a dispatch channel of the plurality of channels includes dispatch messages, wherein the dispatch channel is a dedicated physical layer pipe (PLP) for the dispatch messages and wherein the dispatch channel has a different bitrate than the subset of the plurality of channels;
 analyzing a low level signaling (LLS) table for the dispatch channel to determine whether a dispatch message has been added to the ATSC broadcast signal;
 selecting a mode of operation of a set of modes of operation based on the analyzing, the set of modes of operation comprising:
  a sleep mode of operation if a version of the LLS table for the dispatch channel has not changed from a previous version; and
  a dispatch mode of operation in response to detecting a change in the version of the LLS table for the dispatch channel, wherein in the dispatch mode of operation, dispatch messages not destined for the ATSC receiver are ignored and an emergency operation is actuated in response determining that a particular dispatch message of the dispatch messages is destined for the ATSC receiver; and
 executing, by the ATSC receiver, in response to the selecting, the selected mode of operation.

18. The method of claim 17, a synchronization physical layer pipe (PLP) embedded in the ATSC broadcast signal identifies the dispatch channel.

19. The method of claim 18, wherein qualifying data for the particular dispatch message identifies a subset of network addresses assigned to a region, such that the ATSC receiver ignores the particular dispatch message in response to the ATSC receiver being outside the subset of network addresses assigned to the region and the ATSC receiver actuates the emergency operation in response to the ATSC receiver being assign a network address within the subset of network addresses assigned to the region.

20. The method of claim 19, wherein actuation of the emergency operation causes the ATSC receiver to wirelessly send an emergency event notification to an application executing on a mobile computing device, wherein the application outputs information characterizing the emergency event notification in response to receiving the emergency event notification.

21. The method of claim 20, wherein the application queries an external service for information about a region characterized in the emergency event notification in response to receiving the emergency event notification.

22. The method of claim 19, wherein actuation of the emergency operation comprises displaying, on the ATSC receiver, information for an emergency event characterized in the particular dispatch message.

23. The method of claim 17, further comprising updating provisioning data stored at the ATSC receiver responsive to detecting a provisioning update message encoded in the ATSC broadcast signal that is destined for the ATSC receiver.

* * * * *